US010942619B2

(12) United States Patent
Tapadia

(10) Patent No.: US 10,942,619 B2
(45) Date of Patent: Mar. 9, 2021

(54) INTERACTIVE REALITY ACTIVITY AUGMENTATION

(71) Applicant: TOUCHMAGIX MEDIA PVT. LTD., Pune (IN)

(72) Inventor: Anup Tapadia, Pune (IN)

(73) Assignee: TOUCHMAGIX MEDIA PVT. LTD., Pune (IN)

( * ) Notice: Subject to any disclaimer, the term of this patent is extended or adjusted under 35 U.S.C. 154(b) by 0 days.

(21) Appl. No.: 16/906,008

(22) Filed: Jun. 19, 2020

(65) Prior Publication Data

US 2020/0401297 A1    Dec. 24, 2020

(51) Int. Cl.
| | |
|---|---|
| *G06F 3/048* | (2013.01) |
| *G06F 3/0481* | (2013.01) |
| *G06K 9/00* | (2006.01) |
| *G06T 19/00* | (2011.01) |
| *G06T 19/20* | (2011.01) |
| *G01S 17/894* | (2020.01) |

(52) U.S. Cl.
CPC ........ *G06F 3/04815* (2013.01); *G01S 17/894* (2020.01); *G06K 9/00671* (2013.01); *G06T 19/006* (2013.01); *G06T 19/20* (2013.01)

(58) Field of Classification Search
CPC ... G06F 3/048; G01S 17/894; G06K 9/00671; G06T 19/006; G06T 19/20
USPC ......................................................... 715/757
See application file for complete search history.

(56) References Cited

U.S. PATENT DOCUMENTS

| 7,949,249 B2 | 5/2011 | Gai et al. |
| 8,282,485 B1 | 10/2012 | Zhang |
| 8,292,733 B2 | 10/2012 | Crawford et al. |
| 9,047,698 B2 * | 6/2015 | Maciocci ................ G06F 3/167 |

(Continued)

FOREIGN PATENT DOCUMENTS

WO     2018224847 A2    12/2018

OTHER PUBLICATIONS

International Search Report issued in International Application No. PCT/IN2020/050541, dated Oct. 14, 2020, 3 Pages.

(Continued)

*Primary Examiner* — William D Titcomb
(74) *Attorney, Agent, or Firm* — Dave Law Group LLC; Raj S. Dave

(57) ABSTRACT

A system for interactive reality activity augmentation includes a sensing unit, digital projectors and a server. The sensing unit illuminates activity surfaces and captures one of series of real-time images and co-ordinates information of the activity surfaces. The server includes a memory and a processor. The processor receives and processes one of the series of received real-time images and the co-ordinates information to detect presence and tracks trajectories and calculate individual co-ordinates of physical activity objects, virtual objects and users along the activity surfaces to detect interaction information, and feeds the calculated co-ordinates and the interaction information to a scheduler through an application program interface to manipulate one or more contents running inside the scheduler in response to the co-ordinates information and the interaction information. The digital projectors project the one or more manipulated contents over the activity surfaces to provide the interactive reality augmented activity experience.

20 Claims, 16 Drawing Sheets

(56) References Cited

U.S. PATENT DOCUMENTS

| | | | |
|---|---|---|---|
| 9,161,019 B2* | 10/2015 | Millett | H04N 13/25 |
| 9,495,226 B2 | 11/2016 | Fernandez | |
| 10,068,373 B2* | 9/2018 | Lee | G06F 3/04815 |
| 10,401,901 B2* | 9/2019 | Park | A61B 5/1114 |
| 10,438,262 B1* | 10/2019 | Helmer | G09G 3/003 |
| 10,701,318 B2* | 6/2020 | Valli | H04S 7/303 |
| 10,754,417 B2* | 8/2020 | Harvey | G06F 3/011 |
| 10,788,836 B2* | 9/2020 | Ebrahimi Afrouzi | A47L 9/0472 |
| 10,795,431 B2* | 10/2020 | Ross | G06T 19/006 |
| 10,817,128 B2* | 10/2020 | Murphy | G06F 3/011 |
| 10,818,088 B2* | 10/2020 | Jones | G06K 9/00671 |
| 10,818,093 B2* | 10/2020 | Chen | G06T 5/20 |
| 10,819,657 B2* | 10/2020 | Burger | H04L 47/781 |
| 10,861,239 B2* | 12/2020 | Jones | G06T 19/006 |
| 2006/0068365 A1 | 3/2006 | Smith | |
| 2009/0062002 A1 | 3/2009 | Kotlarik et al. | |
| 2009/0278794 A1 | 11/2009 | McReynolds et al. | |
| 2011/0053688 A1 | 3/2011 | Crawford et al. | |
| 2011/0234896 A1 | 9/2011 | Ivashin et al. | |
| 2013/0249947 A1 | 9/2013 | Reitan | |
| 2015/0301509 A1 | 10/2015 | Bovino et al. | |
| 2015/0317801 A1* | 11/2015 | Bentley | G08B 21/043 382/107 |
| 2015/0318015 A1* | 11/2015 | Bose | A63F 13/212 386/248 |
| 2016/0322078 A1* | 11/2016 | Bose | A63F 13/217 |
| 2019/0217175 A1 | 7/2019 | Fransson | |
| 2019/0349426 A1* | 11/2019 | Smith | H04L 67/104 |
| 2020/0184278 A1* | 6/2020 | Zadeh | G06F 16/953 |
| 2020/0225673 A1* | 7/2020 | Ebrahimi Afrouzi | A47L 9/1409 |

OTHER PUBLICATIONS

Written Opinion issued in International Application No. PCT/IN2020/050541, dated Oct. 14, 2020, 6 Pages.

* cited by examiner

INTERACTIVE REALITY ACTIVITY AUGMENTATION

CROSS-REFERENCE TO RELATED APPLICATIONS

This application claims priority to India Provisional Application No. 201921025059, entitled "INTERACTIVE BOWLING", filed on Jun. 24, 2019. The contents of the aforementioned application are incorporated by reference in their entirety.

FIELD OF THE INVENTION

This disclosure relates generally to activity augmentation and, more particularly, to an interactive reality activity augmentation.

BACKGROUND

Generally, activity/gaming experience of the users are enhanced by providing virtual reality activity/gaming. Virtual reality activity/gaming provides an enhanced activity/gaming experience to the users by taking the users to a virtual world. However, virtual reality activity/gaming requires a special confined environment or space to create an immersive environment to enhance the activity/gaming experience of the users, which makes it more expensive and complex.

In order to overcome the above-mentioned shortcomings and in addition to provide a reality activity/gaming experience to the users, there is a need for the augmented reality activity/gaming. Augmented reality activity/gaming provides the augmented reality experience to the users by capturing real-world scene around the users and augmenting activity/gaming experience based on interaction among the objects and the users. However, there are lots of complexities and technical difficulties involved in effectively capturing the real-world scene, monitoring the interactions between the users and the objects and providing an augmented interactive reality activity/gaming experience based on the interactions. The above-mentioned shortcomings are addressed herein in the present disclosure.

SUMMARY OF INVENTION

Disclosed are a system, a method, and a non-transitory storage medium of an interactive reality activity augmentation.

In one aspect, a system for interactive reality activity augmentation is described herein. The system includes a sensing unit and a server. The sensing unit is adapted to emanate illumination on one or more activity surfaces, and capture one of (a) a series of real-time images and (b) co-ordinates information of the one or more activity surfaces. The one or more activity surfaces being engaged by one or more users using at least one of (a) one or more physical activity objects and (b) one or more virtual objects. The server is communicatively coupled to the sensing unit. The server is adapted to monitor, devise, calculate co-ordinates information and process interactions among the one or more users, the one or more virtual objects and the one or more physical activity objects along the one or more activity surfaces for real-time relaying of one or more manipulated contents over the one or more activity surfaces. The server includes a memory and a processor communicatively coupled to the memory. The processor is configured to: communicate a signal to one or more digital projectors to project one or more contents comprising the one or more virtual objects over the one or more activity surfaces; receive one of (a) the series of real-time images of the one or more activity surfaces and (b) the co-ordinates information of the one or more activity surfaces from the sensing unit via one or more media transceivers or via direct connections; process one of (a) the series of received real-time images and (b) the received co-ordinates information of the one or more activity surfaces to detect presence of the one or more physical activity objects, the one or more virtual objects and the one or more users on the one or more activity surfaces and track trajectories and calculate individual co-ordinates information of the one or more physical activity objects, the one or more virtual objects and the one or more users along the one or more activity surfaces; analyze the calculated individual co-ordinates information of the one or more physical activity objects, the one or more virtual objects and the one or more users to detect information of at least one of (a) interaction between the one or more users and the one or more virtual objects and (b) interaction between the one or more physical activity objects and the one or more virtual objects; and communicate the individual co-ordinates information and the detected interaction information to a scheduler through an application programming interface to manipulate the one or more contents running inside the scheduler in real-time in response to the interaction information detected and the individual co-ordinates information. The one or more activity surfaces comprises at least one of open-air surfaces, enclosed surfaces, regular surfaces, irregular surfaces, inclined surfaces, declined surfaces, porous surfaces, non-porous surfaces, flexible surfaces, rigid surfaces, curved surfaces, gaseous surfaces, permeable surfaces, plain surfaces and contoured surfaces. The one or more activity surfaces are positioned at least one of a perpendicular plane and a parallel plane with respect to the one or more users. The one or more activity surfaces are positioned at one or more angles with respect to the one or more users.

In one embodiment, the sensing unit includes one or more illumination sources and one or more cameras. The one or more illumination sources adapted to uniformly or non-uniformly illuminate the one or more activity surfaces to facilitate capturing the series of real-time images of the one or more activity surfaces. The one or more illumination sources are dynamically adjustable. The one or more cameras adapted to capture the series of real-time images of the one or more activity surfaces.

In another embodiment, the sensing unit includes one of: one or more light detection and ranging sensors (LIDAR) installed at least one of a floor level and a ceiling level to the one or more activity surfaces, the one or more light detection and ranging sensors adapted to scan the one or more activity surfaces at horizontal axis and generate the co-ordinates information of the one or more activity surfaces; one or more infrared cameras that are used in combination with one or more structured light-based illumination units to capture the co-ordinates information of the one or more activity surfaces; one or more stereo cameras that captures the co-ordinates information of the one or more activity surfaces; one or more time of flight (TOF) sensors that captures the co-ordinates information of the one or more activity surfaces. The one or more light detection and ranging sensors (LIDAR) are used independently or in combination with the one or more illumination sources and the one or more infrared cameras to track and generate the co-ordinates information of the one or more activity surfaces with an optimized accuracy.

In yet another embodiment, the system includes the one or more digital projectors communicatively coupled to the server. The one or more digital projectors are adapted to receive the one or more manipulated contents from the server; and project the one or more manipulated contents over the one or more activity surfaces in real-time to provide interactive augmented reality activity experience.

In yet another embodiment, each camera of the one or more cameras comprise a predefined band-pass filter to eliminate redundant frequencies of light while capturing the series of real-time images of the one or more activity surfaces.

In yet another embodiment, the server communicates a signal to the one or more illumination sources and the one or more cameras to enable the one or more illumination sources and the one or more cameras to coordinate and work in synchronization in order to eliminate ambient noise and to capture the series of real-time images of the one or more activity surfaces with optimized clarity.

In yet another embodiment, the system includes a hardware control block configured to receive feedback signals from the one or more illumination sources and the one or more cameras, in response to the signal communicated; and communicate the received feedback signals to the server to adjust the signal to automatically correct the illumination to the one or more activity surfaces with respect to ambient light changes on the one or more activity surfaces.

In yet another embodiment, the system includes one or more RGB cameras adapted to capture visible light spectrum and the one or more contents projected over the one or more activity surfaces. The captured visible light spectrum and the one or more projected contents are utilized to compute the co-ordinates information of the one or more physical activity objects and the one or more virtual objects either automatically or manually using the one or more physical activity objects as reference.

In yet another embodiment, the server is further configured to map and blend the one or more manipulated contents by combining seams of the one or more digital projectors; and enable the one or more digital projectors to project the mapped and blended contents as one or more uniform seamless contents on the one or more activity surfaces.

In another aspect, a method of interactive reality activity augmentation is described herein. The method includes: emanating, by a sensing unit, illumination to one or more activity surfaces and capturing one of (a) a series of real-time images and (b) co-ordinates information of the one or more activity surfaces, the one or more activity surfaces being engaged by one or more users using at least one of (a) one or more physical activity objects and (b) one or more virtual objects; communicating, by a server, a signal to one or more digital projectors to project one or more contents comprising the one or more virtual objects over the one or more activity surfaces; receiving, by the server, one of (a) the series of real-time images of the one or more activity surfaces and (b) the coordinates information of the one or more activity surfaces from the sensing unit via one or more media transceivers or via direct connections; processing, by the server, one of (a) the series of received real-time images and (b) the co-ordinates information of the one or more activity surfaces to detect presence of the one or more physical activity objects, the one or more virtual objects and the one or more users on the one or more activity surfaces, and track trajectories and calculate individual co-ordinates information of the one or more physical activity objects, the one or more virtual objects and the one or more users along the one or more activity surfaces; analyzing, by the server, the calculated individual co-ordinates information of the one or more physical activity objects, the one or more virtual objects and the one or more users to detect information of at least one of (a) interaction between the one or more users and the one or more virtual objects and (b) interaction between the one or more physical activity objects and the one or more virtual objects; and communicating, by the server, the individual co-ordinates information and the detected interaction information to a scheduler through an application program interface to manipulate the one or more contents running inside the scheduler in real-time in response to the interaction information detected and the individual co-ordinates information.

In an embodiment, emanating illumination to the one or more activity surfaces and capturing one of (a) the series of real-time images and (b) the co-ordinates information of the one or more activity surfaces includes: uniformly or non-uniformly illuminating, by one or more illumination sources, the one or more activity surfaces to facilitate capturing the series of real-time images of the one or more activity surfaces; and capturing, by one or more cameras, the series of real-time images of the one or more activity surfaces.

In another embodiment, processing the series of received real-time images includes: analyzing the series of received real-time images; segmenting the series of received real-time images into background sections and foreground sections; removing the background sections and detecting whether the one or more physical activity objects, the one or more virtual objects and the one or more users are present on the series of received real-time images; pin-pointing on positions of the one or more physical activity objects, the one or more virtual objects and the one or more users and calculate the co-ordinates information of the one or more physical activity objects, the one or more virtual objects and the one or more users when the presence of at least one of the one or more physical activity objects, the one or more virtual objects and the one or more users are detected; and resolving the co-ordinates information of the one or more physical activity objects, the one or more virtual objects and the one or more users from physical space to virtual space to facilitate manipulating the one or more contents running inside the scheduler.

In yet another embodiment, the method includes: receiving, by the one or more digital projectors, the one or more manipulated contents from the server; and projecting, by the one or more digital projectors, the one or more manipulated contents over the one or more activity surfaces in real-time to provide interactive augmented reality activity experience.

In yet another embodiment, detecting the presence of the one or more physical activity objects, the one or more virtual objects and the one or more users on the one or more activity surfaces includes: projecting mapped display with sensing capabilities to indicate and detect the presence of the one or more physical activity objects, the one or more virtual objects and the one or more users when the one or more physical activity objects, the one or more virtual objects and the one or more users moves and comes within sensing zone.

In yet another embodiment, the method includes: communicating, by the server, a signal to the one or more illumination sources and the one or more cameras to enable the one or more illumination sources and the one or more cameras to coordinate and work in synchronization in order to eliminate ambient noise and to capture the series of real-time images of the one or more activity surfaces with optimized clarity.

In yet another embodiment, the method includes: receiving, by a hardware control block, feedback signals from the one or more illumination sources and the one or more cameras, in response to the signal communicated; and communicating, by the hardware control block, the received feedback signals to the server to adjust the signal to automatically correct the illumination to the one or more activity surfaces with respect to ambient light changes on the one or more activity surfaces.

In yet another embodiment, the method includes: enabling, by an application programming interface, one or more third-party applications to interface and control the scheduler module to project the one or more desired contents to augment activity experience; enabling, by the application programming interface, the one or more third-party applications to analyze scores won by the one or more users and compare the scores of the one or more users with other users in the third-party applications and post across one or more social media networks; and integrating, by the application programming interface, one or more displays connected locally or at remote areas to provide information to the one or more users regarding scores, rewards, and compliments.

In yet another embodiment, the method includes: training the one or more users based on the calculated co-ordinates, trajectories and path to perform at least one of (a) effectively interact with the one or more physical activity objects, (b) effectively interact with the one or more virtual objects, (c) perform trick actions and (d perform predefined actions on the one or more activity surfaces; and monitoring actions of the one or more users based on the training provided and guides the one or more users to perform the one or more predefined actions on the one or more activity surfaces through at least one of audio outputs and video outputs.

In yet another aspect, a non-transitory computer storage medium of interactive reality activity augmentation is described herein. The non-transitory computer storage medium storing a sequence of instructions, which when executed by a processor, causes interactive reality activity augmentation by emanating illumination on one or more activity surfaces and capturing one of (a) a series of real-time images and (b) co-ordinates information of the one or more activity surfaces, the one or more activity surfaces being engaged by one or more users using at least one of (a) one or more physical activity objects and (b) one or more virtual objects; communicating a signal to one or more digital projectors to project one or more contents comprising the one or more virtual objects over the one or more activity surfaces; receiving one of (a) the series of captured real-time images of the one or more activity surfaces and (b) the coordinates information of the one or more activity surfaces from a sensing unit via one or more media transceivers or via direct connections; processing one of (a) the series of received real-time images and (b) the received coordinates information of the one or more activity surfaces to detect presence of the one or more physical activity objects, the one or more virtual objects and the one or more users on the one or more activity surfaces, and track trajectories and calculate individual co-ordinates of the one or more physical activity objects, the one or more virtual objects and the one or more users along the one or more activity surfaces; analyzing the calculated individual co-ordinates information of the one or more physical activity objects, the one or more virtual objects and the one or more users to detect information of at least one of (a) interaction between the one or more users and the one or more virtual objects and (b) interaction between the one or more physical activity objects and the one or more virtual objects; and communicating the calculated individual co-ordinates information and the detected interaction information to a scheduler through an application program interface to manipulate the one or more contents running inside the scheduler in response to the interaction information detected and the individual co-ordinates information.

In an embodiment, the interactive reality activity augmentation is caused by receiving the one or more manipulated contents from a server; and projecting the one or more manipulated contents over the one or more activity surfaces in real-time to provide augmented reality activity experience.

The interactive reality activity augmentation system disclosed herein is adapted to provide the interactive reality activity augmentation experience to the one or more users based on the interaction among the one or more physical activity objects, the one or more virtual objects and the one or more activity surfaces. The interactive reality activity augmentation system is also adapted to capture the series of real-time images of the one or more game surfaces that are positioned at one or more angles and at one or more planes (e.g. perpendicular, parallel, etc.) with optimum illumination. The interactive reality activity augmentation system also effectively detects the presence and position of the one or more physical activity objects, the one or more virtual objects and the one or more users and tracks the trajectories/path of the one or more physical activity objects, the one or more virtual objects and the one or more users. The interactive reality activity augmentation system further utilizes the tracked trajectories/path to calculate co-ordinates information of the one or more physical activity objects, the one or more virtual objects and the one or more users and manipulate the one or more contents in response to the co-ordinates information to provide interactive reality augmentation activity experience to the one or more users.

The methods and systems disclosed herein may be implemented in any means for achieving various aspects and may be executed in a form of a non-transitory machine-readable medium embodying a set of instructions that, when executed by a machine, causes the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Figure 1:
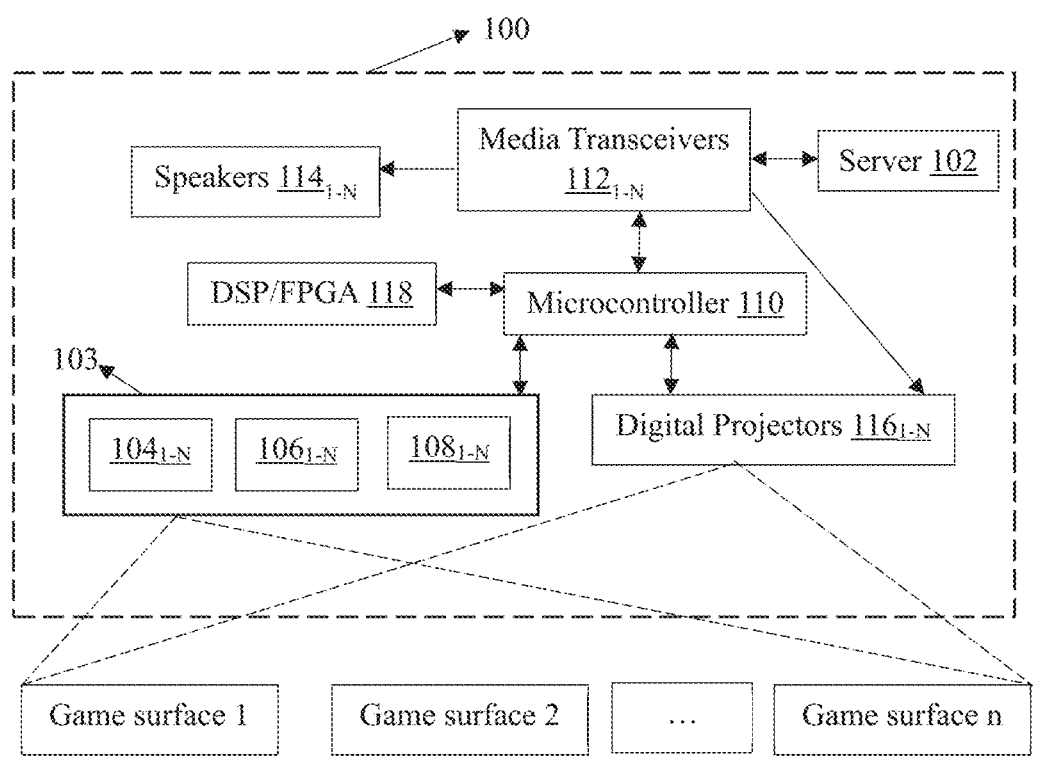
FIG. 1 illustrates a schematic view of an interactive reality activity augmentation system, according to one or more embodiments.

Other features of the present embodiments will be apparent from the accompanying drawings and from the detailed description that follows.

DETAILED DESCRIPTION

The articles "a" and "an" are used herein refers to one or to more than one (i.e., to at least one) of the grammatical object of the article. By way of example, "an element" means one element or more than one element.

In order to fully understand the scope of the invention, the following terms used herein are hereby defined.

The term "comprising", which is synonymous with "including", "containing", or "characterized by" here is defined as being inclusive or open-ended, and does not exclude additional, unrecited elements or method steps, unless the context clearly requires otherwise.

The term "media" is defined as forms of electronically transmitted information, such as audio, video, graphics, and/or text.

The term "device" is defined as an electronic element that cannot be divided without destroying its stated function.

The term "user" includes a person or a computer.

The term "server" is defined as a computer that manages network resources.

The term "communicatively coupled" is defined as devices connected in a way that permits communication.

The term "configured" is defined as arranged within the system to perform certain functions.

The term "receiving" is defined as being given information.

The term "response" is defined as something constituting a reply or a reaction.

The term "based on" is defined as dependent on.

The term "a plurality of" is defined as multiple.

The term "memory" is defined as any device in which information can be stored.

The term "execute" is defined as run or launch.

The term "instructions" is defined as software program or machine executable code.

The term "trigger" is defined as an event, message, or message sequence sufficient to initiate, cause, or task an action.

The term "component" is intended to be broadly construed as hardware, firmware, and/or a combination of hardware and software.

The term "illumination sources" is defined as structured or unstructured light source configured to provide illumination/lightings to activity surfaces.

The term "activity surfaces" is defined as surface on which user is playing a game or performing an activity with activity objects.

The term "real-time" is defined as the actual time during which a process or event occurs.

The term "processor" is defined as a component in the server for executing instructions stored in memory.

The term "transceivers" is defined as a component used for both transmission and reception of digital data.

The term "physical activity objects" is defined as the real activity objects on the activity surfaces to which the user interacts while performing an activity on the activity surfaces.

The term "virtual objects" is defined as the imaginary or digital objects that are projected onto the activity surfaces to augment activity experience.

The term "interaction" is defined as an action that occurs when physical activity objects, virtual objects and users meet each other.

The term "trajectories" is defined as path on which the one or more physical activity objects, the one or more virtual objects and the one or more users move along the activity surfaces.

The term "co-ordinates" is defined as points from respective axes used to indicate the position of the one or more physical activity objects, the one or more virtual objects and the one or more users along the one or more activity surfaces.

The term "scheduler" is defined as component in the server for scheduling a content for a particular user to the particular activity surface.

The term "band-pass filter" is defined as a device that passes frequencies within a certain range and rejects frequencies outside that range.

The term "synchronization" is defined as coordination between two or more elements or components at same time.

The term "ambient noise" is defined as noise that are relating to immediate surroundings.

The term "visible light spectrum' is defined as range of wavelengths of light that are visible to human eye.

The term "map and blend" is defined as aligning image and/or video frame with respect to the projecting area and creating a set of continuous images that connects a pair of input images.

Implementations and all of the functional operations described in this specification may be realized in digital electronic circuitry, or in computer software, firmware, or hardware.

A software program (also known as a program, software, executable code or instructions) may be written in any appropriate form of programming language, including compiled or interpreted languages, and it may be deployed in any appropriate form, including as a standalone program or as a module, component, subroutine, or other unit suitable for use in a computing environment.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Even though particular combinations of features are recited in the claims and/or disclosed in the specification, these combinations are not intended to limit the disclosure of possible implementations. Other implementations are within the scope of the claims.

Example embodiments, as described below, may be used to provide interactive reality activity augmentation. It will be appreciated that the various embodiments discussed herein need not necessarily belong to the same group of embodiments and may be grouped into various other embodiments not explicitly disclosed herein. In the following description, for purposes of explanation, numerous specific details are set forth in order to provide a thorough understanding of the various embodiments.

The foregoing disclosure provides illustration and description but is not intended to be exhaustive or to limit the implementations to the precise form disclosed. Modifications and variations are possible in light of the above disclosure or may be acquired from practice of the implementations.

The present disclosure discloses an Interactive reality activity augmentation. The interactive reality activity augmentation is provided herein by capturing one of a series of real-time images and co-ordinates information of one or more activity surfaces, analyzing one of the series of real-time images and the co-ordinates information to track, calculate and resolve co-ordinates information of one or more physical activity objects, one or more virtual objects and one or more users on the one or more activity surfaces to detect information of interaction among the one or more users, the one or more physical activity objects and the one or more virtual objects. The one or more contents running inside a scheduler are then manipulated in response to the co-ordinates calculated and the interaction information detected. The one or more manipulated contents are then projected over the one or more activity surfaces to provide the interactive reality activity augmentation.

FIG. 1 illustrates a schematic view of an Interactive reality activity augmentation system 100, according to one or more embodiments. The interactive reality activity augmentation system 100 comprises a server 102, a sensing unit 103, a microcontroller 110, one or more speakers $114_{1-N}$ and one or more digital projectors $116_{1-N}$. In an embodiment, the sensing unit 103 comprises one or more illumination sources $104_{1-N}$, one or more cameras $106_{1-N}$ and one or more RGB cameras $108_{1-N}$. The one or more illumination sources $104_{1-N}$ may comprise one or more infrared illumination sources and the one or more cameras $106_{1-N}$ may comprise one or more infrared cameras. In an embodiment, the one or more infrared illumination sources lights up the one or more activity surfaces in infrared spectrum light frequency ranging between 850 nm and 950 nm in order to enable the one or more infrared cameras to sense the infrared illumination and eliminate unwanted frequencies of light. In another embodiment, each infrared camera of the one or more infrared cameras comprise a predefined band-pass filter to eliminate the unwanted frequencies of light while capturing a series of real-time images of the one or more activity surfaces.

In another embodiment, the sensing unit 103 comprises the one or more infrared cameras and the one or more illumination sources $104_{1-N}$ in combination with one or more light detection and ranging sensors (LIDAR) to improve accuracy of detection and tracking of one or more physical activity objects, one or more virtual objects and one or more users by generating one of one-dimensional co-ordinates, two-dimensional co-ordinates and three-dimensional co-ordinates information. In yet another embodiment, the sensing unit 103 comprises the one or more infrared cameras and a structured light-based illumination sources to capture three-dimensional co-ordinates of the one or more activity surfaces. In yet another embodiment, the sensing unit 103 comprises one of (a) one or more time of flight sensors and (b) one or more stereo cameras to capture three-dimensional co-ordinates of the one or more activity surfaces which is then provided as an input to the server 102 to detect and track the one or more physical activity objects, the one or more virtual objects and the one or more users with an optimized accuracy.

The interactive reality activity augmentation system 100 may comprise one of a field programmable gate array unit (FPGA) and a digital signal processing (DSP) unit 118 to clean up the series of real-time images at hardware level before the series of real-time images are transmitted to the server 102 for further processing. In an embodiment, the interactive reality activity augmentation system 100 comprises a lens distortion correction unit configured to correct lens distortion noise from the series of real-time images.

The sever 102 is communicatively coupled to the one or more illumination sources $104_{1-N}$, the one or more cameras $106_{1-N}$ and the one or more RGB cameras $108_{1-N}$ and the one or more digital projectors 116-N. In one or more embodiments, the server 102 is one of but not limited to a computer, a laptop, a desktop, a tablet and a personal digital assistance. The one or more illumination sources $104_{1-N}$ is configured to emanate uniform or non-uniform illumination to the one or more activity surfaces. In an embodiment, the one or more illumination sources $104_{1-N}$ are dynamically adjustable to provide appropriate illumination at appropriate positions of the one or more activity surfaces. The uniform or non-uniform illumination of the one or more activity surfaces is performed to facilitate capturing the series of real-time images of the one or more activity surfaces. In an embodiment, the one or more illumination sources are positioned at one or more predefined distances and one or more predefined angles with respect to the one or more activity surfaces to uniformly or non-uniformly illuminate the one or more activity surfaces. The one or more cameras $106_{1-N}$ captures the series of real-time images of the activity surfaces. In an embodiment, the one or more cameras $106_{1-N}$ are positioned at one or more predefined distances and one or more predefined angles with respect to the one or more activity surfaces to capture the series of real-time images of the one or more activity surfaces with optimized clarity. In an embodiment, the one or more activity surfaces are positioned at one of a perpendicular plane, a parallel plane and a combination of both the perpendicular plane and the parallel plane to the one or more users. In another embodiment, the one or more activity surfaces are positioned at one or more angles with respect to the one or more users. In yet another embodiment, the one or more activity surfaces comprises at least one of open-air surfaces, enclosed surfaces, regular surfaces, irregular surfaces, inclined surfaces, declined surfaces, porous surfaces, non-porous surfaces, flexible surfaces, rigid surfaces, curved surfaces, gaseous surfaces, permeable surfaces, plain surfaces and contoured surfaces.

The server 102 receives one of (a) the series of real-time images and (b) the co-ordinates information of the one or more activity surfaces and processes one of (a) the series of real-time images and (b) the co-ordinates information of the one or more activity surfaces to detect and track the one or more physical activity objects, the one or more virtual objects and the one or more users along the activity surfaces and to detect information of interaction among the one or more physical activity objects, the one or more virtual objects and the one or more users. The interaction may be at least one of the interactions between the one or more users and the one or more virtual objects and the interaction between the one or more physical activity objects and the one or more virtual objects. The server 102 manipulates one or more contents running inside a scheduler based on tracked information (e.g. co-ordinates information and interaction information) of the one or more physical activity objects, the one or more virtual objects and the one or more users along the one or more activity surfaces. The server 102 then communicates the one or more manipulated contents to the one or more digital projectors $116_{1-N}$ to project the one or more manipulated contents over the one or more activity surfaces in real-time and provide an interactive augmented reality activity experience to users. In an embodiment, each digital projector of the one or more digital projectors $116_{1-N}$ comprise one or more structured or unstructured lighting arrangements to provide illumination to the one or more activity surfaces. In another embodiment, the structured or unstructured lighting arrangements enables the one or more users to perform at least one of adjust brightness level and change color of the illumination provided to the one or more activity surfaces based on lighting requirements of the one or more activity surfaces.

The microcontroller 110 is configured to function as a primary control interface between software components and hardware components implemented within the system. In an embodiment, the microcontroller may be a microprocessor. The interactive reality activity augmentation system 100 may comprise one or more media transceivers $112_{1-N}$. The one or more media transceivers $112_{1-N}$ are adapted to enable digital data communication (i.e. reception and transmission) in the system. The one or more speakers $114_{1-N}$ are configured to provide audio feedback to the one or more users to provide interactive reality augmented activity experience to the one or more users. In one embodiment, the one or more speakers $114_{1-N}$ are positioned at predefined angles to further enhance the interactive reality augmented activity experience to the one or more users. In another embodiment, the one or more users are persons who are performing the activity.

Figure 2:
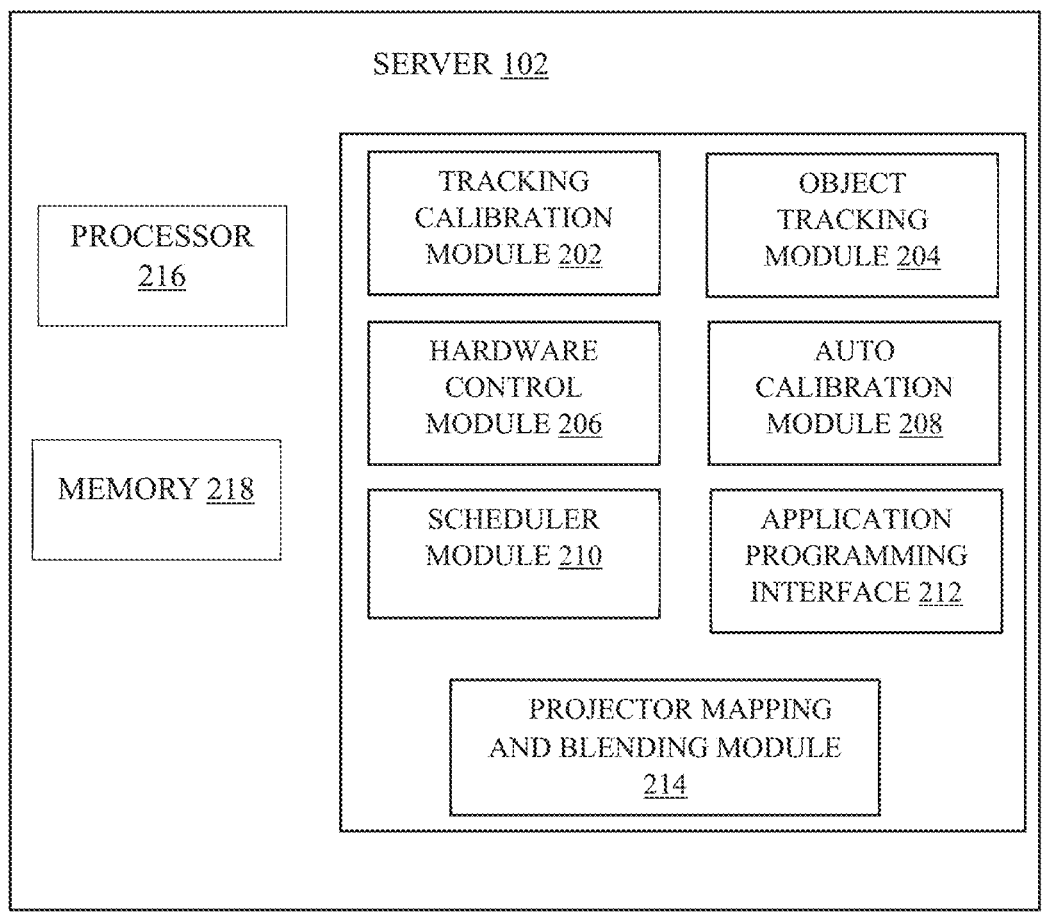
FIG. 2 illustrates an exploded view of a server of the interactive reality activity augmentation system of FIG. 1, according to one or more embodiments.

FIG. 2 illustrates an exploded view of the server 102 of the interactive reality activity augmentation system 100 of FIG. 1, according to one or more embodiments. The server 102 communicates a signal to the one or more digital projectors $116_{1-N}$ to project the one or more contents comprising the one or more virtual objects over the one or more activity surfaces. The server 102 comprises a tracking calibration module 202, an object tracking module 204, a hardware control module 206, an auto calibration module 208, a scheduler module 210, an application programming interface 212 and a projector mapping and blending module 214. The server 102 further includes a processor 216 and a memory 218. The server 102 receives one of (a) the series of real-time images and (b) the co-ordinates information of the one or more activity surfaces and processes one of (a) the series of real-time images (b) the co-ordinates information of the one or more activity surfaces by running the above-mentioned modules using the processor 216. The tracking calibration module 202 is configured to calibrate all sensors (e.g. IR sensors, cameras, projectors, etc.) connected with the interactive reality activity augmentation system 100 and to orient/align video frame (e.g. video/image capturing frame) with respect to projection area of the one or more digital projectors $116_{1-N}$. The tracking calibration module 202 is configured to enable the one or more users to specify a region of interest of the one or more activity surfaces on the video frame to generate calibration data manually to detect and track the one or more physical activity objects and the one or more virtual objects specifically on the region of interest of the one or more activity surfaces. In an embodiment, the tracking calibration module 202 provides a user interface to the one or more users to select at least four corner points on the video frame to specify the region of interest. In another embodiment, the auto calibration module 208 detects/specifies the region of interest automatically using utilizing camera feeds from the one or more RGB cameras $108_{1-N}$.

The hardware control module 206 is configured to enable communication among the server 102, the sensing unit 103 (e.g. the one or more illumination sources $104_{1-N}$, the one or more cameras $106_{1-N}$ etc.) and the one or more digital projectors $116_{1-N}$. In an embodiment, the hardware control module 206 communicates a signal to the one or more illumination sources $104_{1-N}$ and the one or more cameras $106_{1-N}$ to coordinate and work in synchronization in order to eliminate ambient noise and to capture the series of real-time images of the one or more activity surfaces with optimized clarity. The hardware control module 206 is further configured to receive feedback signals the one or more illumination sources $104_{1-N}$ and the one or more cameras $106_{1-N}$, in response to the signal communicated. The hardware control module 206 then communicates the received feedback signals to enable the server 102 to adjust the signal to automatically correct the illumination provided to the one or more activity surfaces with respect to ambient light changes on the one or more activity surfaces. The interactive reality activity augmentation system 100 may comprise the one or more RGB cameras $108_{1-N}$ to capture visible light spectrum and capture the one or more projected contents over the one or more activity surfaces. In an embodiment, the auto calibration module 208 automatically calibrates and generates the calibration data using camera feeds from the one or more RGB cameras $108_{1-N}$. The auto calibration module 208 utilizes at least one of the one or more projected contents, one or more physical markers and the one or more physical activity objects to generate the co-ordinates data of physical space of the one or more activity surfaces which in-turn is used for calibration.

The object tracking module 204 is configured to detect the presence of the one or more physical activity objects, the one or more virtual objects and the one or more users on the one or more activity surfaces and tracks trajectories or path of the one or more physical activity objects, the one or more virtual objects and the one or more users along the one or more activity surfaces using the calibration data. The object tracking module 204 detects the presence of the one or more physical activity objects, the one or more virtual objects and the one or more users by analyzing and segmenting each of the received series of real-time images into background sections and foreground sections. The object tracking module 204 then removes the background sections and eliminates ambient noise from the series of real-time images. The object tracking module 204 then checks for the presence of the one or more physical activity objects, the one or more virtual objects and the one or more users on the one or more activity surfaces. The object tracking module 204 then pinpoints on positions of the one or more physical activity objects, the one or more virtual objects and the one or more users and calculates individual co-ordinates information of the one or more physical activity objects, the one or more virtual objects and the one or more users along the trajectories or path when at least one of the presence of the one or more physical activity objects, the one or more virtual objects and the one or more users are detected. In an embodiment, the object tracking module 204 trains the one or more users based on the tracked information (e.g. the co-ordinates information, trajectory/path of the physical activity objects, the one or more virtual objects and the one or more users along the activity surfaces) to perform at least one of (a) effectively interact with the one or more physical activity objects, (b) effectively interact with the one or more virtual objects, (c) perform trick actions and (d) perform one or more predefined actions on the one or more activity surfaces. In another embodiment, the object tracking module 204 monitors the actions of the one or more users based on the training provided and alerts/guides the one or more users to perform the one or more predefined actions on the one or more activity surfaces through at least one of audio outputs (via the one or more speakers $114_{1-N}$) and video outputs (via the one or more projectors $116_{1-N}$). The object tracking module 204 then resolves the co-ordinates information of the one or more physical activity objects, the one or more virtual objects and the one or more users from physical space to virtual space to facilitate manipulating the one or more contents running inside the scheduler. The object tracking module 204 analyzes the co-ordinates information of the one or more virtual objects, the one or more physical activity objects and the one or more users to detect information of (a) interaction between the one or more users and the one or more virtual objects and (b) interaction between the one or more users and the one or more physical activity objects The scheduler module 210 receives the resolved co-ordinates information of the one or more physical activity objects, the one or more virtual objects and the one or more users and the detected interaction information. The scheduler module 210 manipulates the one or more contents running inside the scheduler 210 in real-time based on the received co-ordinates and the detected interaction information. In another embodiment, the manipulation of contents comprises at least one of (a) change in contents and/or effects in the one or more contents and (b) addition of dimension of sound to the one or more contents. The scheduler module 210 also provides a user interface to the one or more users to interact with the server 102 and create a playlist of the one or more desired contents that are to be projected on the one or more activity surfaces. The application programming interface 212 communicates one or more triggers to the scheduler 210 to manipulate the one or more contents. In an embodiment, the one or more triggers are generated based on the co-ordinates information and the interaction information. The application programming interface 212 is also configured to enable third party applications and systems to interface and control the scheduler 210 to further enhance the activity experience to the one or more users. In an embodiment, the application programming interface 212 is configured to enable third party applications to analyze scores won/gained by the one or more users and compare the scores of the one or more users with other players in the third-party applications and post in the one or more social media networks. In another embodiment, the application programming interface 212 also allows the one or more users to share scores in one or more social media networks. In yet another embodiment, the application programming interface 212 integrates one or more displays connected locally or at remote areas to display information to the one or more users regarding scores, rewards and compliments. The projector mapping and blending module 214 maps and blends the one or more manipulated contents by merging seams of the one or more digital projectors $116_{1-N}$, without any overlap, into a single seamless projector to project one or more uniform seamless contents over the one or more activity surfaces. The projector mapping and blending module 214 also corrects distortions while merging the seams of the one or more digital projectors $116_{1-N}$ The mapped and blended contents are then projected by the one or more digital projectors $116_{1-N}$ to provide the interactive augmented reality activity experience of the users.

Figure 3:
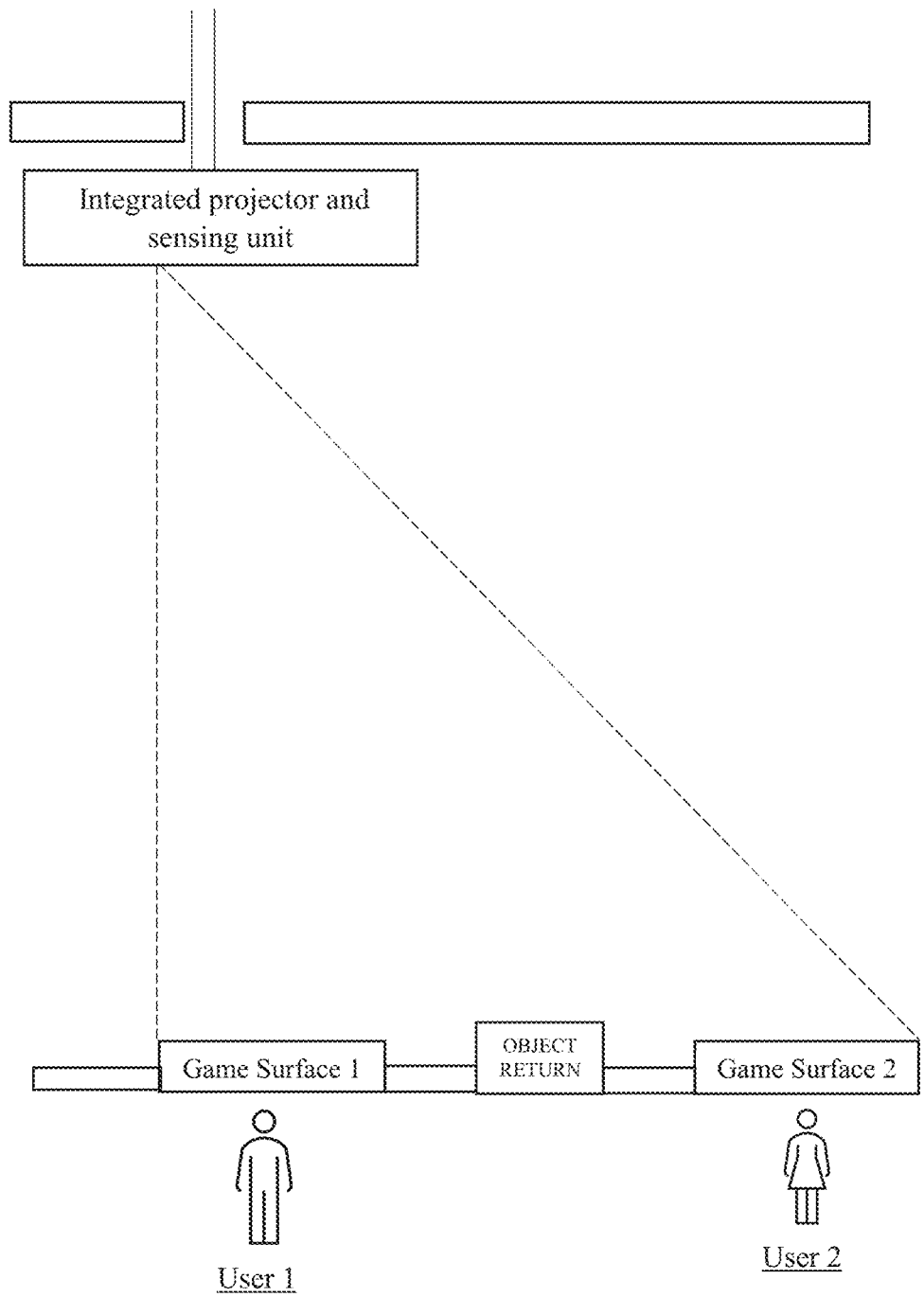
FIG. 3 illustrates integrated installation of one or more digital projectors and sensing unit along one or more activity surfaces, according to one or more embodiments.

FIG. 3 illustrates integrated installation of the one or more digital projectors $116_{1-N}$ and the sensing unit 103 along the one or more activity surfaces, according to one or more embodiments. According to one embodiment, the one or more digital projectors $116_{1-N}$ and the sensing unit 103 are integrated and installed to the top-left side of the one or more activity surfaces without any obstruction to floor. According to another embodiment, the one or more digital projectors $116_{1-N}$ and the sensing unit 103 are integrated and installed to the top-right side of the one or more activity surfaces. According to yet another embodiment, the integrated arrangement of the one or more digital projectors $116_{1-N}$ and the sensing unit 103 are installed over the one or more activity surfaces that are positioned at one of (a) a perpendicular plane, (b) a parallel plane and (c) a combination of both the perpendicular plane and parallel plane with respect to the one or more users. According to yet another embodiment, the integrated arrangement of the one or more digital projectors $116_{1-N}$ and the sensing unit 103 are installed over the one or more activity surfaces that are positioned at one or more angles with respect to the one or more users.

Figure 4:
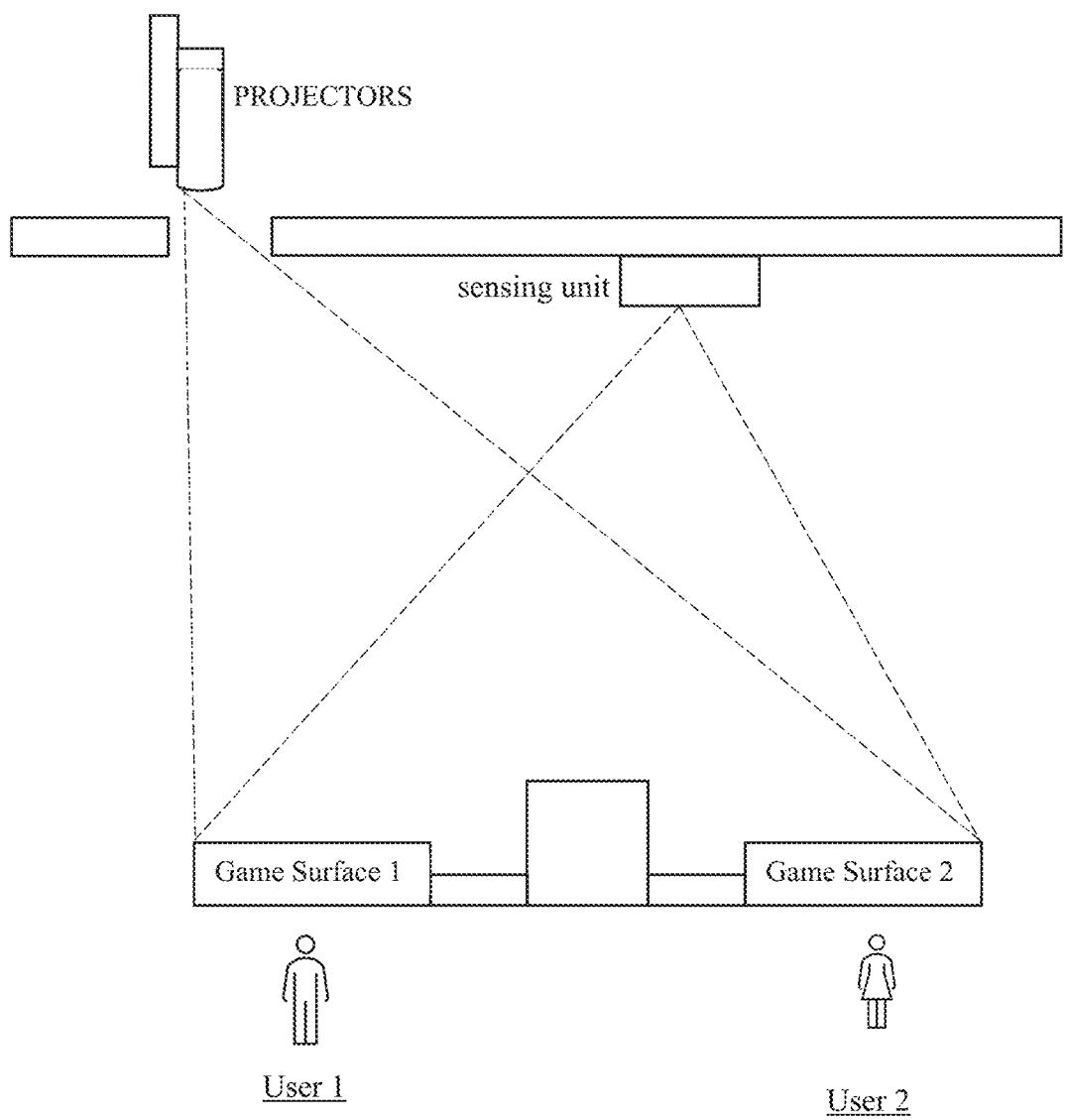
FIG. 4 illustrates non-integrated installation of the one or more digital projectors and the sensing unit along the one or more activity surfaces, according to one or more embodiments.

FIG. 4 illustrates non-integrated installation of the one or more digital projectors $116_{1-N}$ and the sensing unit 103 along the one or more activity surfaces, according to one or more embodiments. According to an embodiment, the one or more digital projectors $116_{1-N}$ are installed at the top-left side of the one or more activity surfaces without any obstruction to floor. According to another embodiment, the one or more digital projectors $116_{1-N}$ are installed at the top-right side of the one or more activity surfaces without any obstruction to floor. The sensing unit 103 comprising the one or more cameras $106_{1-N}$, the one or more illumination sources $104_{1-N}$ and the one or more RGB cameras $108_{1-N}$ are installed at the top-center in alignment to the one or more activity surfaces. According to one embodiment, the non-integrated arrangement of the one or more digital projectors $116_{1-N}$ and the sensing unit 103 are installed at the one or more activity surfaces that are positioned at one of (a) a perpendicular plane, (b) a parallel plane and (c) a combination of both the perpendicular plane and parallel plane with respect to the one or more users. According to yet another embodiment, the non-integrated arrangement of the one or more digital projectors $116_{1-N}$ and the sensing unit 103 are installed over the one or more activity surfaces that are positioned at one or more angles with respect to the one or more users.

Figure 5A:
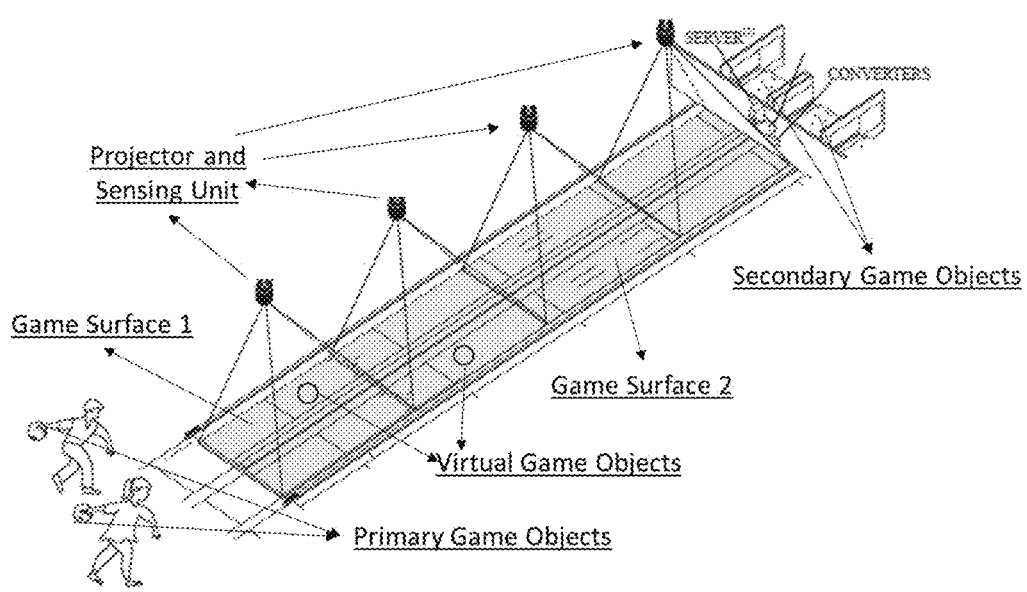
FIG. 5a-5d illustrates an installation of the interactive reality activity augmentation system on the one or more activity surfaces of different games/activities, according to one or more embodiments.
Figure 5B:
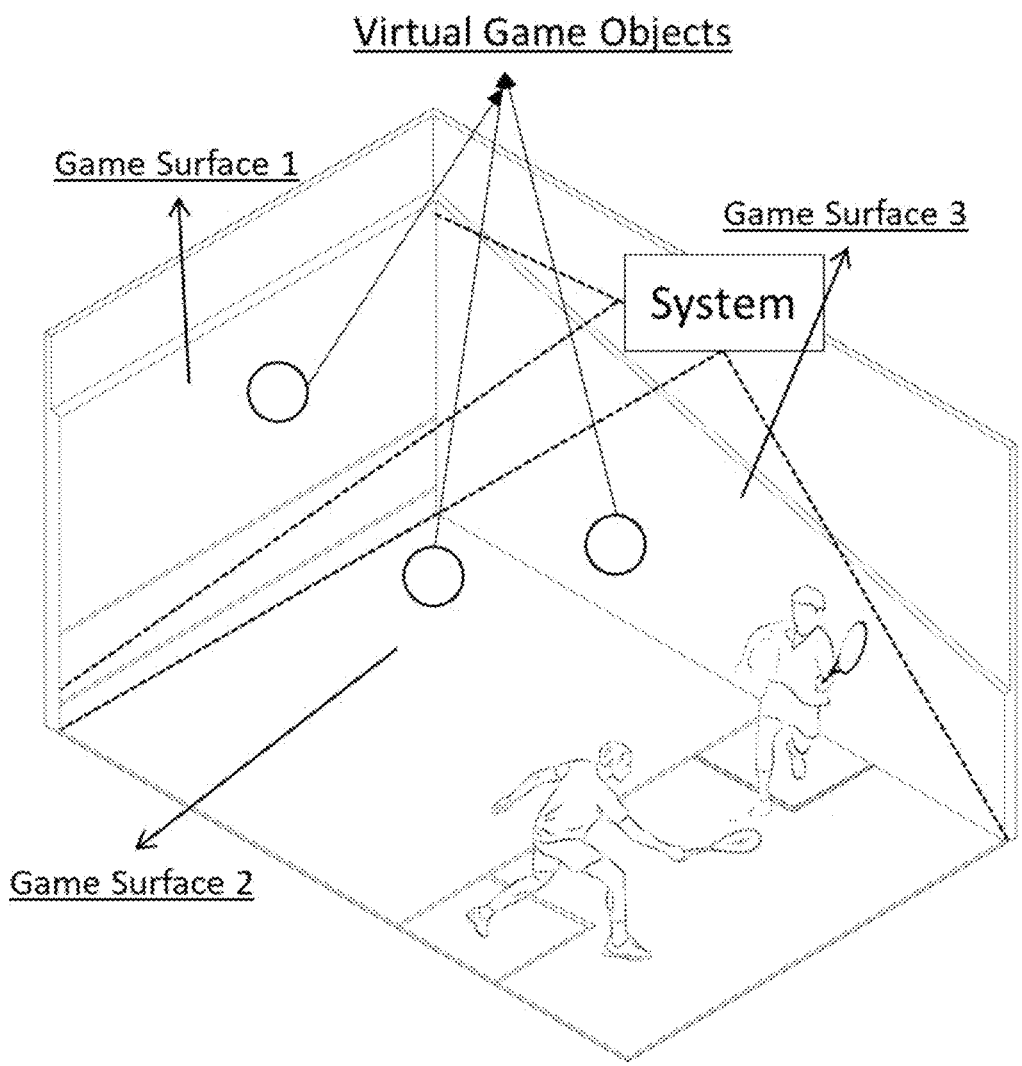

FIG. 5a-5d illustrates an installation of the interactive reality activity augmentation system (100) on the one or more activity surfaces of different games/activities, according to one or more embodiments. FIG. 5a specifically depicts the top view of installation of the interactive reality activity augmentation system (100) on one or more bowling alley lanes. The one or more users (e.g. players) interacts with one or more secondary physical activity objects (e.g. pins) through one or more primary physical activity objects (e.g. balls) on the one or more activity surfaces (e.g. bowling alley lanes) while performing an activity. Each digital projector of the one or more digital projectors $116_{1-N}$, either integrated or non-integrated, is installed with an equal predefined space with the successive digital projector of the one or more digital projectors $116_{1-N}$ on top of the one or more activity surfaces. The seams of the successive digital projectors of the one or more digital projectors $116_{1-N}$ comprises a predefined overlap. In an embodiment, the projector mapping and blending module 214 maps and blends the predefined overlap to provide the one or more uniform seamless contents. activity FIG. 5b illustrates an installation of the interactive reality activity augmentation system 100 on a squash court, according to one or more embodiments. The one or more users (i.e. players) of the squash court interacts with the one or more physical activity objects (e.g. balls) along the one or more activity surfaces such as side walls, ceilings, opposite walls and floor of the squash court while playing the game or performing the activity. The above-mentioned one or more activity surfaces of the squash court are positioned at one of (a) a perpendicular plane, (b) a parallel plane and (c) combination of both the perpendicular plane and the parallel plane with respect to the one or more users. The interactive reality activity augmentation system 100 comprising the sensing unit (103) and the one or more digital projectors ($116_{1-N}$), either integrated or non-integrated, is positioned at one or more predefined positions and at one or more predefined angles with respect to the one or more activity surfaces of the squash court to provide appropriate illumination and project the one or more manipulated contents over the one or more activity surfaces in an optimized way to provide the interactive reality augmented activity experience to the one or more users.

Figure 5C:
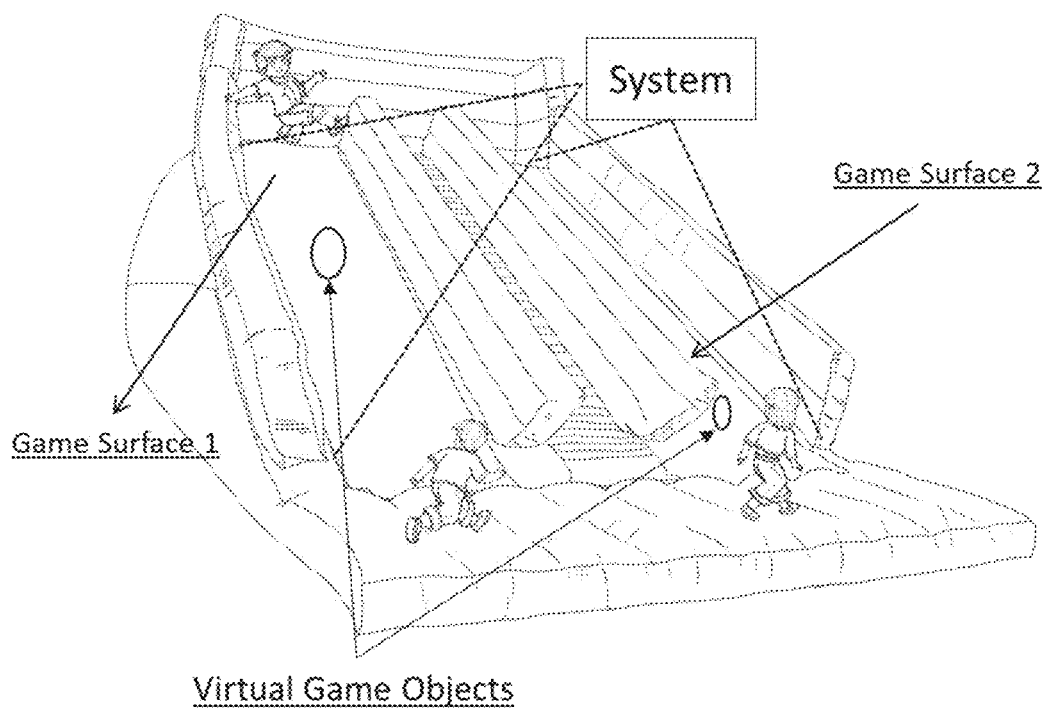

FIG. 5c illustrates an installation of the interactive reality activity augmentation system 100 on a slide, according to one or more embodiments. The one or more users (i.e. players) of the slide interacts directly with the one or more activity surfaces. The one or more activity surfaces of the slide includes inclined surfaces. The above-mentioned one or more activity surfaces of the slide are at one or more inclined angles with respect to the user. The interactive reality activity augmentation system 100 comprising the sensing unit (103) and the one or more digital projectors ($116_{1-N}$), either integrated or non-integrated, is positioned at one or more predefined positions and at one or more predefined angles with respect to the one or more activity surfaces of the slide to provide appropriate illumination and project the one or more manipulated contents over the one or more activity surfaces in an optimized way to provide the interactive reality augmented activity experience to the one or more users.

Figure 5D:
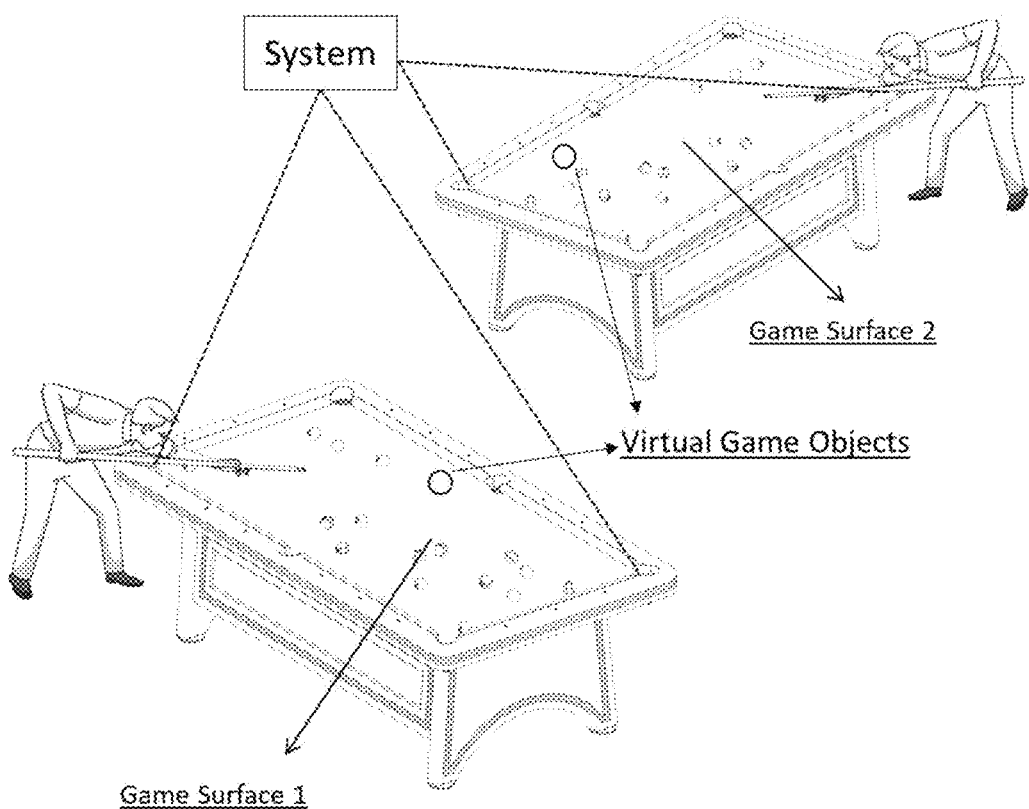

FIG. 5d illustrates an installation of the interactive reality activity augmentation system 100 on one or more pool tables, according to one or more embodiment. The one or more users (i.e. players) interacts with one or more secondary physical activity objects (e.g. balls) through one or more primary physical activity objects (e.g. cue sticks) on the one or more activity surfaces (e.g. pool tables) while playing the game or performing the activity (e.g. snooker, billiards, pool, carom, etc.). The above-mentioned one or more activity surfaces (e.g. pool tables) are positioned at one or more predefined positions and at predefined angles with respect to the one or more users. The interactive reality activity augmentation system 100, comprising the sensing unit (103) and the one or more digital projectors ($116_{1-N}$), is positioned at one or more predefined positions and at one or more predefined angles with respect to the one or more activity surfaces to provide appropriate illumination and project the one or more manipulated contents over the one or more activity surfaces in an optimized way to provide the interactive reality augmented activity experience to the one or more users.

Figure 6A:
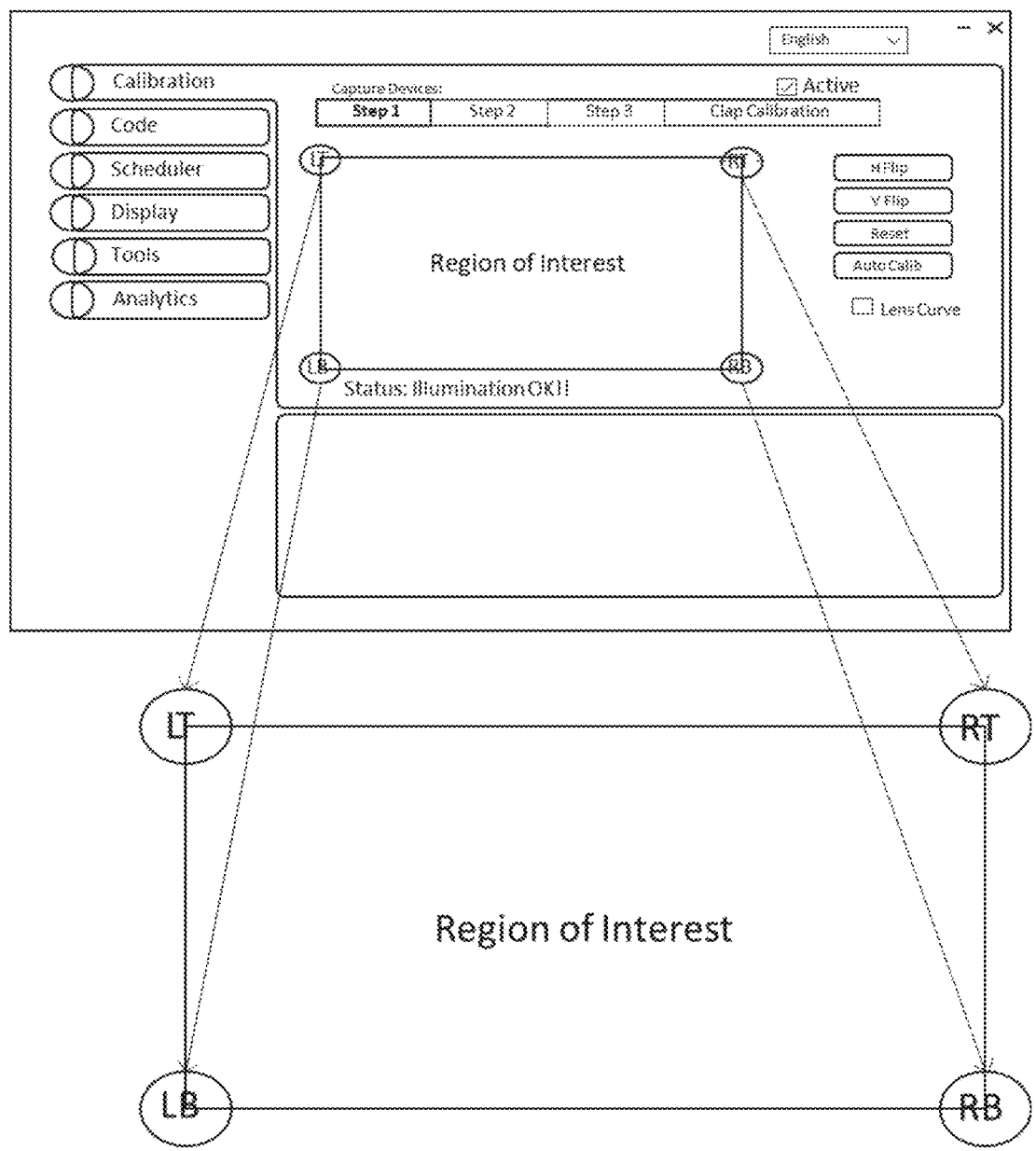
FIG. 6a-6b illustrate sequential interface views of process of calibration, according to one or more embodiments.
Figure 6B:
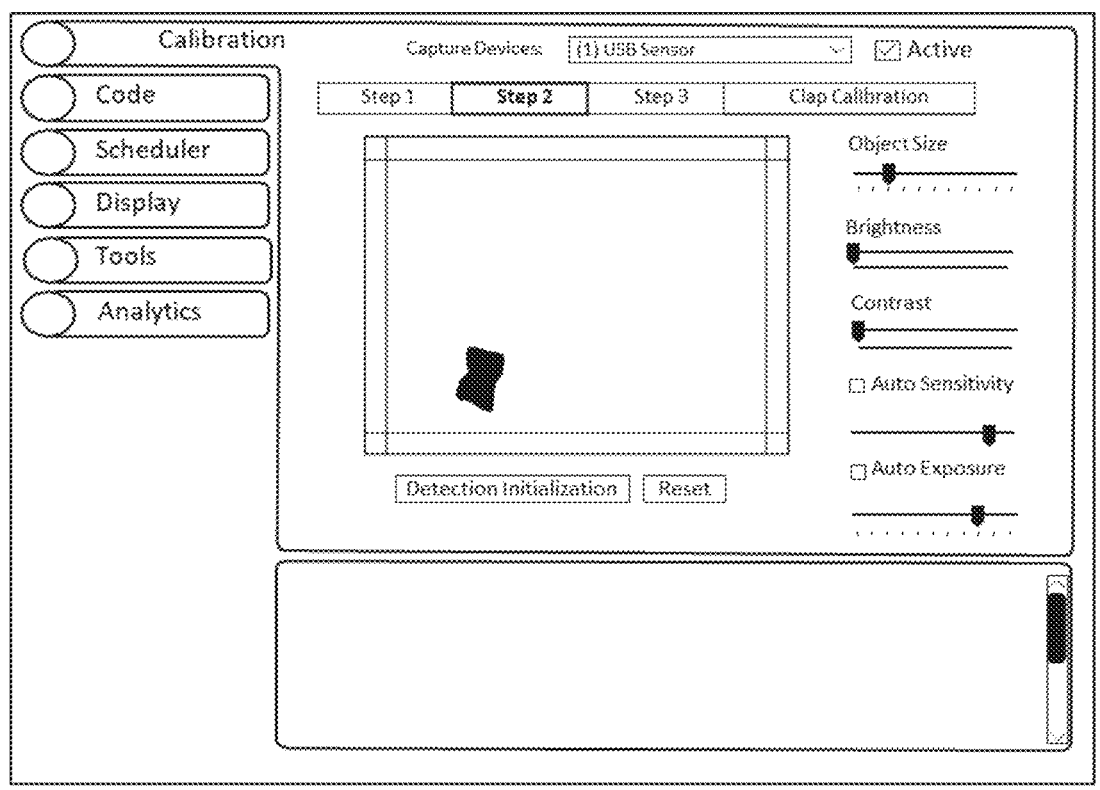

FIG. 6a-6b illustrate sequential interface views of process of calibration, according to one or more embodiments. Once the 'calibration' tab is clicked, the interactive reality activity augmentation system provides interface views as shown in FIGS. 6a-6b. The interface view under 'calibration' tab (as depicted in FIG. 6a) allows the one or more users to select at least one connected sensor (e.g. cameras, IR sensors, RGB cameras etc.) under 'capture devices' tab to adjust the calibration of each connected sensor's area. The interface (as depicted in FIG. 6a) allows the one or more users to perform sequential calibration for the other connected sensors under the 'capture devices' tab to achieve full width sensor calibration for all the connected sensors. The calibration is performed to track X and Y axis of projection area. The interface (as shown in FIG. 6a) provides other tabs such as 'H flip', 'V flip', 'reset' and 'auto calibrate'. 'H flip' and 'V flip' tabs allow the one or more users to orient the video/image frame with respect to the projection area correctly. The image/video frame is flipped horizontally when the user clicks and accesses the 'H flip' tab. The image/video frame is flipped vertically when the user clicks and accesses the 'V flip' tab. The tracking calibration is put to reset when the user clicks and accesses the 'Reset' tab. The tracking calibration is put to auto calibrate mode (i.e. calibration is performed automatically using auto calibration algorithm) when the user clicks and accesses the 'Auto calibrate' tab.

Once the correct orientation is achieved, the interface (as shown in FIG. 6a) displays corner points in the video frame to enable the one or more users to select corners of the projection area. The interface (as shown in FIG. 6a) further allows the one or more users to manually move the corner points left top (LT), right top (RT), left bottom (LB) and right bottom (RB) in the video frame to select the corners of the projection area (as depicted in FIG. 6a).

The interface view (as depicted in FIG. 6b) allows the user to adjust the four corners for aligning grid with borders of the projection area. The interface view (as depicted in FIG. 6b) further provides 'Object Size', 'Brightness', 'Contrast', 'Auto Sensitivity', 'Auto Exposure', 'Detection Initialization' and 'Reset' tabs. An effect of detection of the one or more physical activity objects and the one or more virtual objects is displayed in the video frame on the interface view by moving in sensor zone, when the one or more users clicks and accesses the 'Detection Initialization' tab. The detected area of the one or more objects is displayed in a predefined color (as shown in FIG. 6B). In an embodiment, the predefined color is a fluorescent green color. The brightness and contrast are adjusted when the one or more users clicks and accesses the 'Brightness' and 'Contrast' tabs, respectively. The scenes are automatically detected and light sensitivity is adjusted when the one or more users clicks and accesses the 'Auto Sensitivity' tab. In an embodiment, the interface allows the one or more users to manually adjust the sensitivity according to the availability of light condition. The amount of light per unit area is controlled when the one or more users manually selects the value under the 'Auto Exposure' tab. In an embodiment, the value selected by the one or more users for optimized amount of light per unit area is −4 or −5. The smaller size objects are detected on the one or more activity surface when the user clicks and adjusts the 'Object Size' tab.

Figure 7:
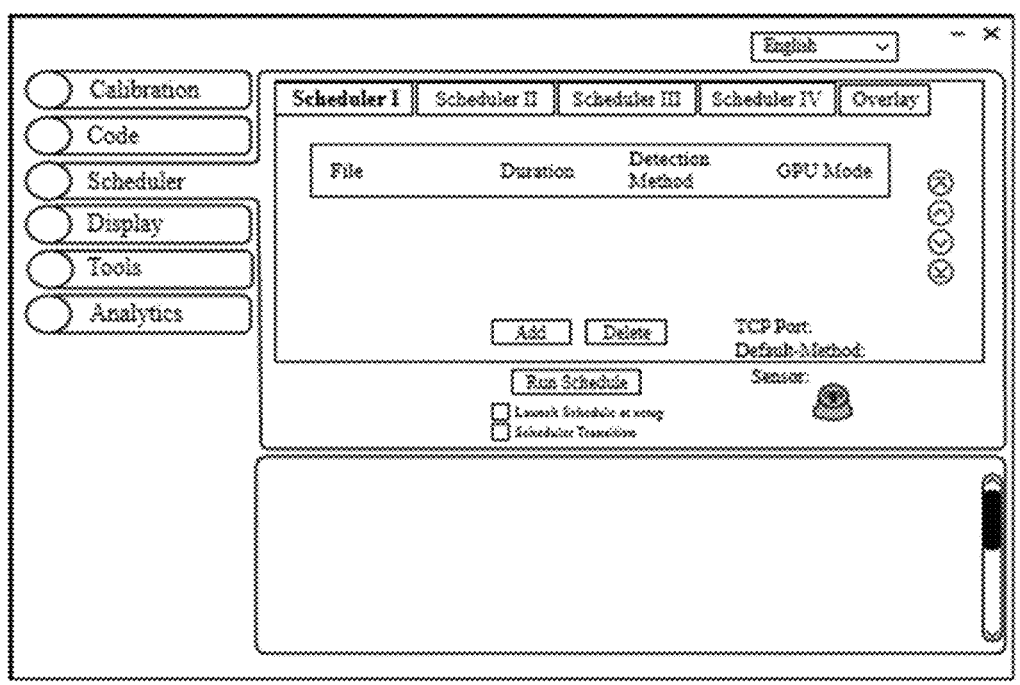
FIG. 7 illustrates an interface view of process of scheduling, according to one or more embodiments.

FIG. 7 illustrates an interface view of process of scheduling, according to one or more embodiments. Once the 'scheduler' tab is clicked the interface displays the one or more schedulers that are connected with interactive reality activity augmentation system 100. In an embodiment, each scheduler is connected to each activity surface. The scheduler is launched by clicking "run scheduler' tab provided under the respective scheduler tab. The one or more users are allowed to define and schedule different creative contents in an order by providing tabs 'Add' and 'Duration' under respective schedulers. When the scheduler is launched, the scheduler runs in a continuous loop until and unless it is stopped manually. 'Add' tab allows the one or more users to select and add the one or more contents in the respective scheduler to each of the activity surfaces when the user clicks the 'Add' tab. 'Duration' tab allows the one or more users to change the duration of the one or more contents running inside the respective scheduler when the one or more users clicks and accesses the 'Duration' tab.

Figure 8A:
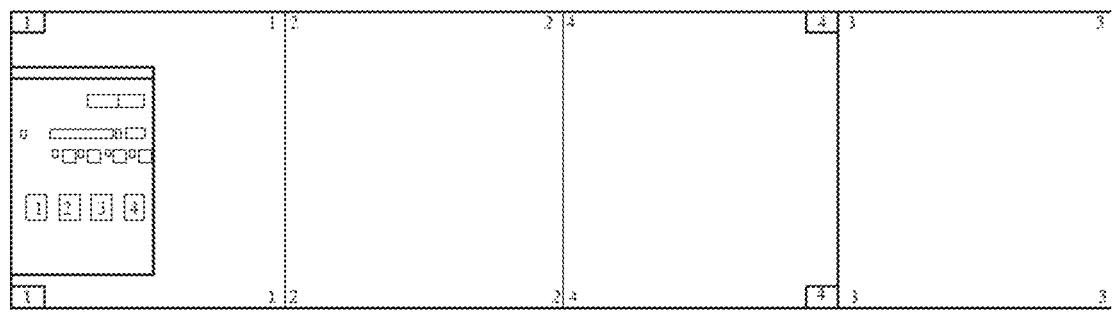
FIG. 8a-8c illustrate sequential interface views of process of displaying/projecting, according to one or more embodiments.
Figure 8A:
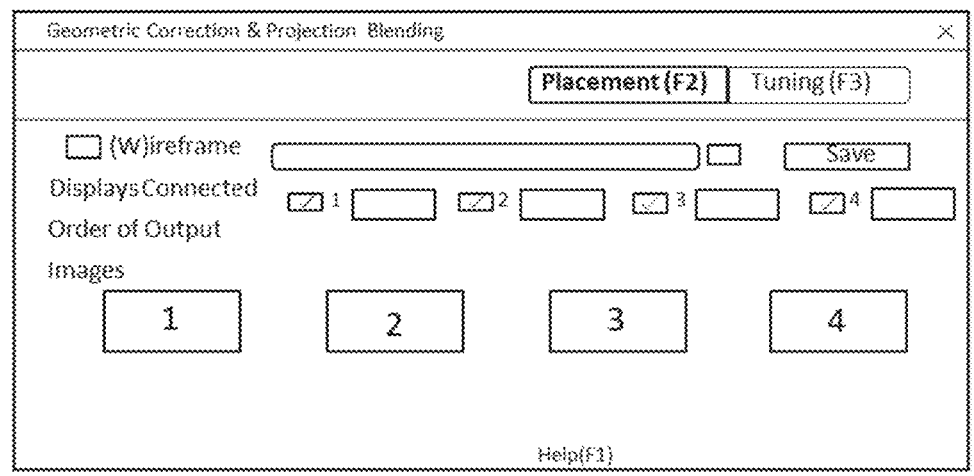
Figure 8B:
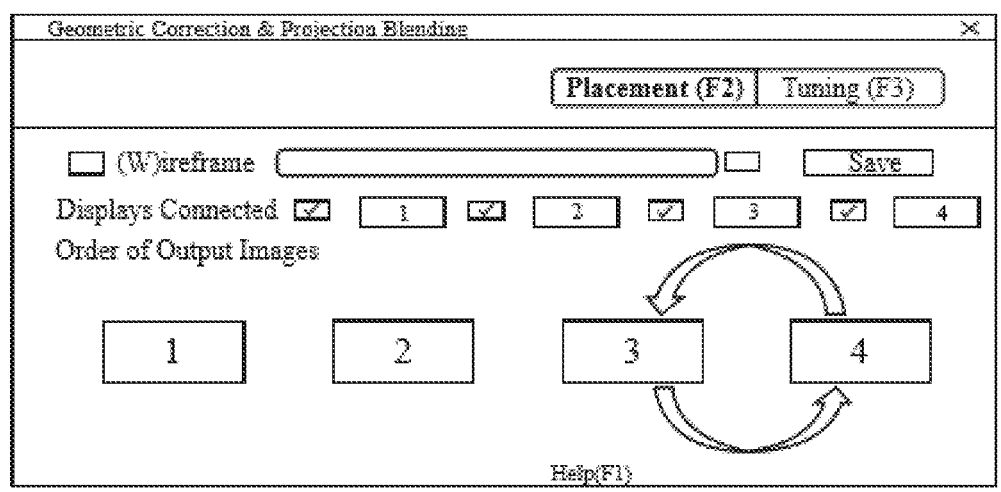
Figure 8C:
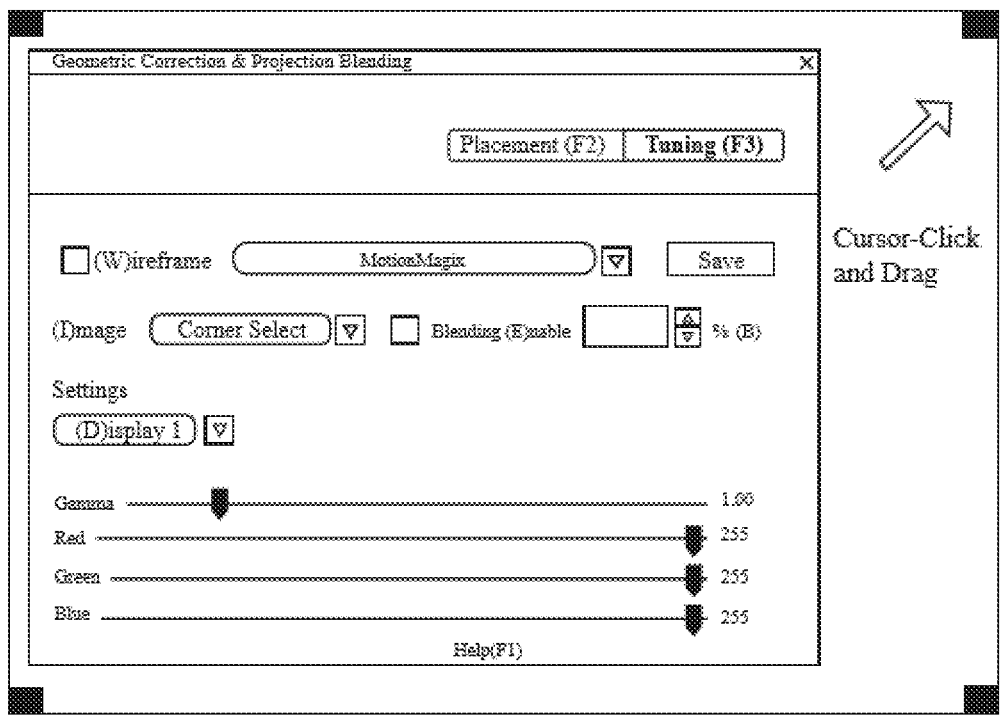

FIG. 8a-8c illustrates sequential interface views of process of displaying/projecting, according to one or more embodiments. The interface view under 'display' tab provides tabs 'Geometric Correction and Blending', 'Projection shape' 'Power schedule', and 'Launch geometric calibration'. 'The Geometric correction and blending' tab allow the one or more users to manage orientation for multiple projectors, control blending of projected area, and final projection area by accessing the 'Launch geometric calibration' tab. Once the geometric calibration feature is launched, the interface view (as depicted in FIG. 8a) with 'placement' and 'tuning' tabs are provided to the one or more users. The number of projectors/displays that are connected to the system is displayed to the one or more users when the 'placement' tab is clicked. The 'placement' tab also allows the one or more users to configure the placement of the displays/projectors (e.g. change sequence/display order of the one or more digital projectors/displays). The 'tuning' tab enables the one or more users to check display/projector order. When the one or more users clicks and accesses the 'tuning' tab, the interface view is provided to the one or more users with 'corner select' and 'blending enable' tabs. Once the 'blending enable' tab is checked the interface view depicting the display/projector order is provided to the one or more users. If the detected display order is incorrect (e.g. 1, 2, 4 and 3), the sequence needs to be rearranged. The interface view is then provided which allows the one or more users to swap the order of the displays/projectors that are to be rearranged. The interface view allows the one or more users to click on the displays/projectors number one after another successively without clicking anywhere else to swap the display/projector sequence. The interface view with rearranged display/projector sequence (as depicted in FIG. 8b) is then provided to the one or more users. The interface view with rearranged display/projector sequence further provides a 'save' tab to allow the one or more users to save the settings (e.g. swapping display order). Once the settings are saved, the 'corner select' tab (as depicted in FIG. 8c) allows the one or more users to move the corner points of each projection when the one or more users clicks the 'corner select' tab and disable the 'blending enable' tab (as depicted in FIG. 8c). In an embodiment, the interface allows the one or more users to adjust the corner points of each projection area using arrow keys.

Figure 9:
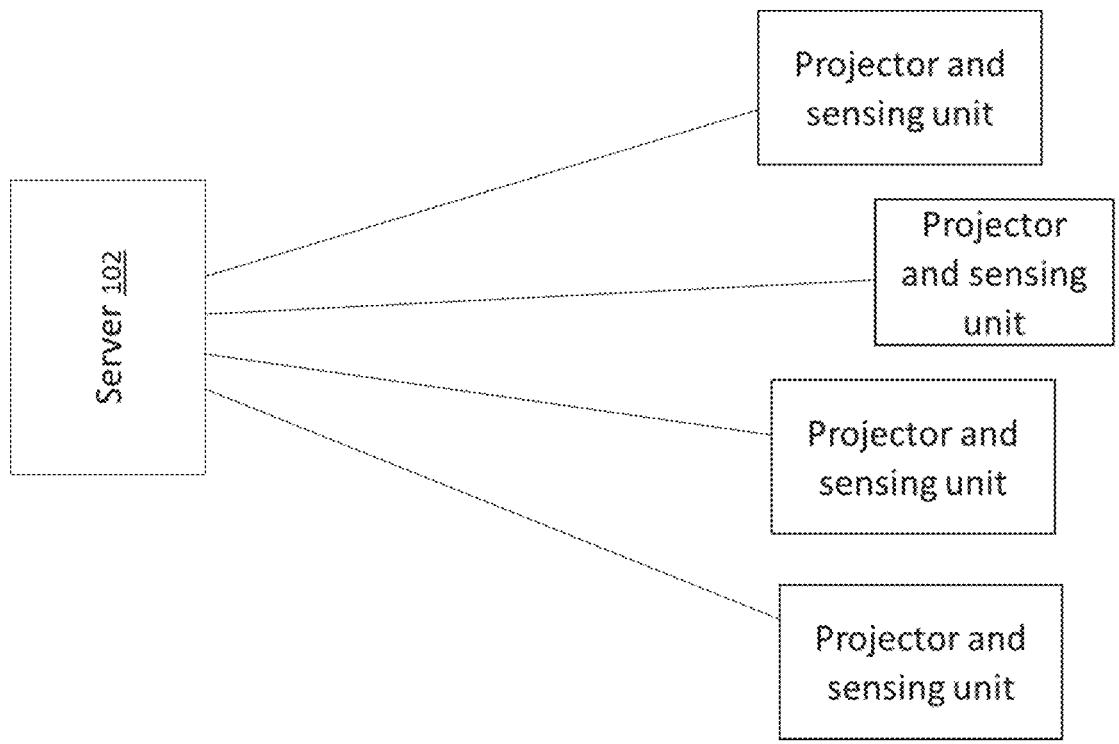
FIG. 9 illustrates an installation architecture of the interactive reality activity augmentation of FIG. 1, according to one or more embodiments.

FIG. 9 illustrates an installation architecture of the interactive reality activity augmentation of FIG. 1, according to one or more embodiments. The installation architecture as depicted in FIG. 9 illustrates that the server 102 is communicatively coupled to the one or more projectors $116_{1-N}$ and the sensing unit 103. In an embodiment, the one or more projectors $116_{1-N}$ and the sensing unit 103 are installed in an integrated manner. In another embodiment, the one or more projectors $116_{1-N}$ and the sensing unit 103 are installed in a non-integrated manner. In yet another embodiment, the server 102 is communicatively coupled to the one or more integrated arrangement of projector and sensing unit depending on size and count of the one or more activity surfaces. In yet another embodiment, the server 102 is communicatively coupled to one or more non-integrated arrangement of projector and sensing unit depending on size and count of the one or more activity surfaces.

Figure 10:
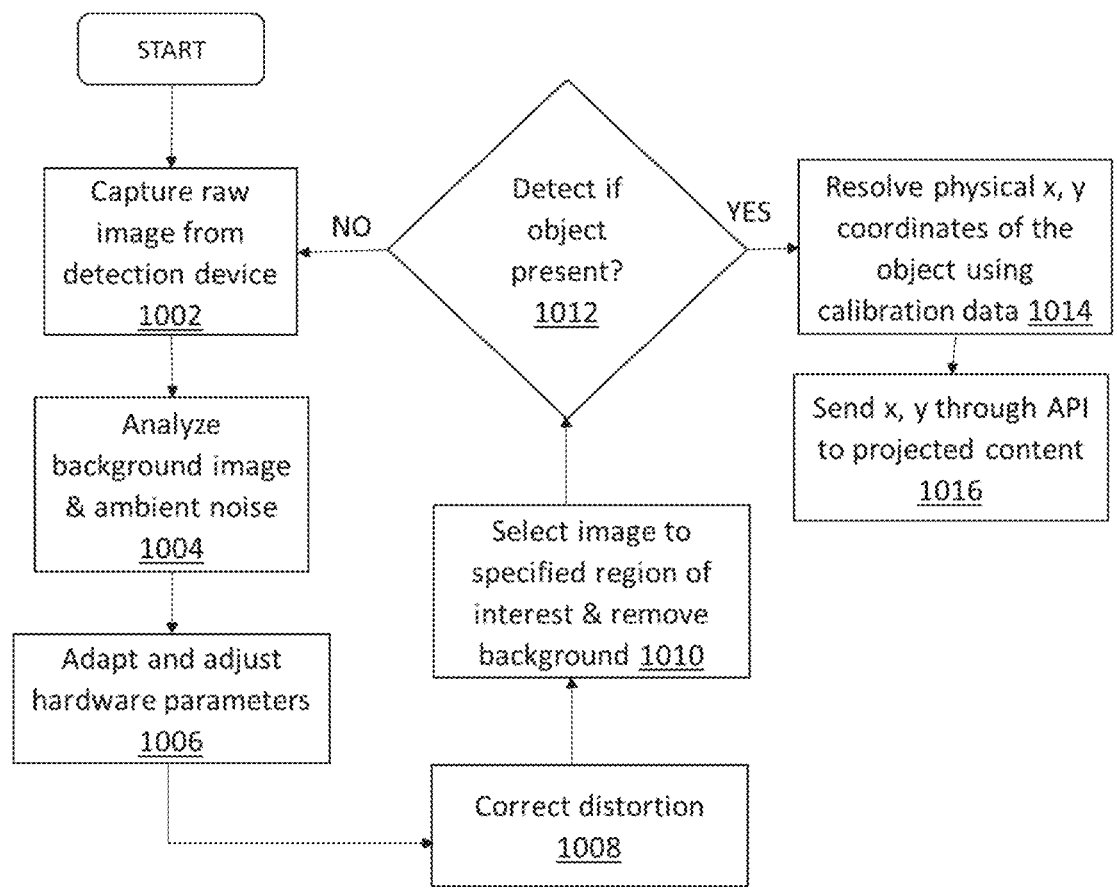
FIG. 10 depicts a flowchart illustrating a method of interactive reality activity augmentation, according to one or more embodiments.

FIG. 10 depicts a flowchart illustrating a method of interactive reality activity augmentation, according to one or more embodiments. At step 1002, the series of real-time images of the one or more activity surfaces are captured using the one or more detection devices (e.g. one or more cameras $106_{1-N}$, one or more stereo cameras etc.). The one or more illumination sources $104_{1-N}$ provides uniform or non-uniform illumination to the one or more activity surfaces while capturing the series of real-time images. At step 1004, the series of real-time captured images are analyzed and implementing a feedback loop and coordinate the one or more illumination sources $104_{1-N}$ and the one or more cameras $106_{1-N}$ to work in synchronization to eliminate the ambient noise while capturing the series of real-time images. At step 1006, the one or more illumination sources $104_{1-N}$, the one or more cameras $106_{1-N}$, are adapted and adjusted to clean up the series of real-time images at hardware level. In an embodiment, the interactive reality activity augmentation 100 may comprise one of a field programmable gate array unit (FPGA) and a digital signal processing unit (DSP) 118 to further clean up the series of real-time images at hardware level before the series of real-time images are transmitted to the server 102 for further processing. At step 1008, the series of real-time images are further cleaned using distortion unit to correct errors caused due to distortion. At step 1010, the image is selected to the region of interest by the tracking calibration module 202 and the region of interest is analyzed and segmented into foreground section and background section to eliminate the background section. At step 1012, the presence of the one or more physical activity objects, the one or more virtual objects and the one or more users are detected by the object tracking module 204 and pinpoint on the positions of the one or more physical activity objects, the one or more virtual objects and the one or more users to calculate the co-ordinates information of the one or more physical activity objects, the one or more virtual objects and the one or more users. At step 1014, the physical coordinates of the one or more physical activity objects, the one or more virtual objects and the one or more users are resolved into virtual coordinates using the calibration data by the object tracking module 204. At step 1016, the coordinates are communicated to the scheduler module 210 through the application programming interface 212 to manipulate the one or more contents in response to the one or more virtual coordinates and interaction information detected. The manipulated contents are then received by the one or more digital projectors $116_{1-N}$ and projected over the one or more activity surfaces to provide the interactive augmented reality activity experience to the users.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structures and methods may be embodied using transistors, logic gates, and electrical circuits (e.g., application specific integrated (ASIC) circuitry and/or Digital Signal Processor (DSP) circuitry).

In addition, it will be appreciated that the various operations, processes and methods disclosed herein may be embodied in a non-transitory machine-readable medium and/or interactive reality activity augmentation system 100. Accordingly, the specification and drawings are to be regarded in an illustrative rather than a restrictive sense.

INCORPORATION BY REFERENCE

All publications, patents, and patent applications cited in this Specification are hereby incorporated by reference in their entirety, including:
US20110053688A1 entitled "Entertainment system providing dynamically augmented game surfaces for interactive fun and learning";
US20190217175A1 entitled "Systems for facilitating practice of bowling and related methods";
US20150301509A1 entitled "Interaction of audio, video, effects and architectural lighting with bowling scoring system and methods of use";
US20090278794A1 entitled "Interactive input system with controlled lighting";
US20090062002A1 entitled "Apparatus and method of detecting and tracking objects in amusement games";
U.S. Pat. No. 9,495,226B2 entitled "Integration of client side applications into a fantasy open platform environment";
U.S. Pat. No. 8,282,485B1 entitled "Constant and shadowless light source";
U.S. Pat. No. 7,949,249B2 entitled "Software based photo-flash synchronization of camera equipped portable media device and external lighting apparatus";
US20110234896A1 entitled "System and method for displaying remote content through multiple Projectors";
US20060068365A1 entitled "Vision training system"; and
US20130249947A1 entitled "Communication using augmented reality".

What is claimed is:

1. A system comprising:
a sensing unit adapted to
emanate illumination on one or more activity surfaces; and
capture one of (a) a series of real-time images and (b) co-ordinates information of the one or more activity surfaces, the one or more activity surfaces being engaged by one or more users using at least one of (a) one or more physical activity objects and (b) one or more virtual objects; and
a server communicatively coupled to the sensing unit, wherein the server adapted to monitor, devise, calculate co-ordinates information and process interactions among the one or more users, the one or more virtual objects and the one or more physical activity objects along the one or more activity surfaces for real-time relaying of one or more manipulated contents over the one or more activity surfaces,
the server comprises
a memory; and
a processor communicatively coupled to the memory, the processor configured to:
communicate a signal to one or more digital projectors to project one or more contents comprising the one or more virtual objects over the one or more activity surfaces;
receive one of (a) the series of real-time images of the one or more activity surfaces and (b) the co-ordinates information of the one or more activity surfaces from the sensing unit via one or more media transceivers or via direct connections;
process one of (a) the series of received real-time images and (b) the received co-ordinates information of the one or more activity surfaces to detect presence of the one or more physical activity objects, the one or more virtual objects and the one or more users on the one or more activity surfaces and track trajectories and calculate individual co-ordinates information of the one or more physical activity objects, the one or more virtual objects and the one or more users along the one or more activity surfaces;
analyze the calculated individual co-ordinates information of the one or more physical activity objects, the one or more virtual objects and the one or more users to detect information of at least one of (a) interaction between the one or more users and the one or more virtual objects and (b) interaction between the one or more physical activity objects and the one or more virtual objects; and
communicate the individual co-ordinates information and the detected interaction information to a scheduler through an application programming interface to manipulate the one or more contents running inside the scheduler in real-time in response to the interaction information detected and the individual co-ordinates information,
wherein the one or more activity surfaces comprises at least one of open-air surfaces, enclosed surfaces, regular surfaces, irregular surfaces, inclined surfaces, declined surfaces, porous surfaces, non-porous surfaces, flexible surfaces, rigid surfaces, curved surfaces, gaseous surfaces, permeable surfaces, plain surfaces and contoured surfaces, wherein the one or more activity surfaces are positioned at least one of a perpendicular plane and a parallel plane with respect to the one or more users, and
wherein the one or more activity surfaces are positioned at one or more angles with respect to the one or more users.

2. The system of claim 1, wherein the sensing unit comprises
one or more illumination sources adapted to uniformly or non-uniformly illuminate the one or more activity surfaces to facilitate capturing the series of real-time images of the one or more activity surfaces, the one or more illumination sources are dynamically adjustable; and
one or more cameras adapted to capture the series of real-time images of the one or more activity surfaces.

3. The system of claim 2, wherein each camera of the one or more cameras comprise a predefined band-pass filter to eliminate redundant frequencies of light while capturing the series of real-time images of the one or more activity surfaces.

4. The system of claim 2, wherein the server communicates a signal to the one or more illumination sources and the one or more cameras to enable the one or more illumination sources and the one or more cameras to coordinate and work in synchronization in order to eliminate ambient noise and to capture the series of real-time images of the one or more activity surfaces with optimized clarity.

5. The system of claim 4, further comprising a hardware control block configured to
receive feedback signals from the one or more illumination sources and the one or more cameras, in response to the signal communicated; and
communicate the received feedback signals to the server to adjust the signal to automatically correct the illumination to the one or more activity surfaces with respect to ambient light changes on the one or more activity surfaces.

6. The system of claim 1, wherein the sensing unit comprises one of:
one or more light detection and ranging sensors (LIDAR) installed at least one of a floor level and a ceiling level to the one or more activity surfaces, the one or more light detection and ranging sensors adapted to scan the one or more activity surfaces at horizontal axis and generate the co-ordinates information of the one or more activity surfaces;
one or more infrared cameras that are used in combination with one or more structured light-based illumination units to capture the co-ordinates information of the one or more activity surfaces;
one or more stereo cameras that captures the co-ordinates information of the one or more activity surfaces; and
one or more time of flight (TOF) sensors that captures the co-ordinates information of the one or more activity surfaces,
wherein the one or more light detection and ranging sensors (LIDAR) are used independently or in combination with the one or more illumination sources and the one or more infrared cameras to track and generate the co-ordinates information of the one or more activity surfaces with an optimized accuracy.

7. The system of claim 1, further comprising:
the one or more digital projectors communicatively coupled to the server, the one or more digital projectors adapted to
receive the one or more manipulated contents from the server; and
project the one or more manipulated contents over the one or more activity surfaces in real-time to provide interactive augmented reality activity experience.

8. The system of claim 1, further comprising one or more RGB cameras adapted to capture visible light spectrum and the one or more contents projected over the one or more activity surfaces, the captured visible light spectrum and the one or more projected contents are utilized to compute the co-ordinates information of the one or more physical activity objects and the one or more virtual objects either automatically or manually using the one or more physical activity objects as reference.

9. The system of claim 1, wherein the server is further configured to:
map and blend the one or more manipulated contents by combining seams of the one or more digital projectors; and
enable the one or more digital projectors to project the mapped and blended contents as one or more uniform seamless contents on the one or more activity surfaces.

10. A method comprising:
emanating, by a sensing unit, illumination to one or more activity surfaces and capturing one of (a) a series of real-time images and (b) co-ordinates information of the one or more activity surfaces, the one or more activity surfaces being engaged by one or more users using at least one of (a) one or more physical activity objects and (b) one or more virtual objects;
communicating, by a server, a signal to one or more digital projectors to project one or more contents comprising the one or more virtual objects over the one or more activity surfaces;
receiving, by the server, one of (a) the series of real-time images of the one or more activity surfaces and (b) the coordinates information of the one or more activity surfaces from the sensing unit via one or more media transceivers or via direct connections;
processing, by the server, one of (a) the series of received real-time images and (b) the co-ordinates information of the one or more activity surfaces to detect presence of the one or more physical activity objects, the one or more virtual objects and the one or more users on the one or more activity surfaces, and track trajectories and calculate individual co-ordinates information of the one or more physical activity objects, the one or more virtual objects and the one or more users along the one or more activity surfaces;
analyzing, by the server, the calculated individual co-ordinates information of the one or more physical activity objects, the one or more virtual objects and the one or more users to detect information of at least one of (a) interaction between the one or more users and the one or more virtual objects and (b) interaction between the one or more physical activity objects and the one or more virtual objects; and
communicating, by the server, the individual co-ordinates information and the detected interaction information to a scheduler through an application program interface to manipulate the one or more contents running inside the scheduler in real-time in response to the interaction information detected and the individual co-ordinates information.

11. The method of claim 10, wherein emanating illumination to the one or more activity surfaces and capturing one of (a) the series of real-time images and (b) the co-ordinates information of the one or more activity surfaces comprises:
uniformly or non-uniformly illuminating, by one or more illumination sources, the one or more activity surfaces to facilitate capturing the series of real-time images of the one or more activity surfaces; and
capturing, by one or more cameras, the series of real-time images of the one or more activity surfaces.

12. The method of claim 11, further comprising:
communicating, by the server, a signal to the one or more illumination sources and the one or more cameras to enable the one or more illumination sources and the one or more cameras to coordinate and work in synchronization in order to eliminate ambient noise and to capture the series of real-time images of the one or more activity surfaces with optimized clarity.

13. The method of claim 12, further comprising:
receiving, by a hardware control block, feedback signals from the one or more illumination sources and the one or more cameras, in response to the signal communicated; and
communicating, by the hardware control block, the received feedback signals to the server to adjust the signal to automatically correct the illumination to the one or more activity surfaces with respect to ambient light changes on the one or more activity surfaces.

14. The method of claim 10, wherein processing the series of received real-time images comprises:
analyzing the series of received real-time images;
segmenting the series of received real-time images into background sections and foreground sections;
removing the background sections and detecting whether the one or more physical activity objects, the one or more virtual objects and the one or more users are present on the series of received real-time images;
pin-pointing on positions of the one or more physical activity objects, the one or more virtual objects and the one or more users and calculate the co-ordinates information of the one or more physical activity objects, the one or more virtual objects and the one or more users when the presence of at least one of the one or more physical activity objects, the one or more virtual objects and the one or more users are detected; and
resolving the co-ordinates information of the one or more physical activity objects, the one or more virtual objects and the one or more users from physical space to virtual space to facilitate manipulating the one or more contents running inside the scheduler.

15. The method of claim 10, further comprising:
receiving, by the one or more digital projectors, the one or more manipulated contents from the server; and
projecting, by the one or more digital projectors, the one or more manipulated contents over the one or more activity surfaces in real-time to provide augmented reality activity experience.

16. The method of claim 10, wherein detecting the presence of the one or more physical activity objects, the one or more virtual objects and the one or more users on the one or more activity surfaces comprises:
projecting mapped display with sensing capabilities to indicate and detect the presence of the one or more physical activity objects, the one or more virtual objects and the one or more users when the one or more physical activity objects, the one or more virtual objects and the one or more users moves and comes within sensing zone.

17. The method of claim 10, further comprising:
enabling, by an application programming interface, one or more third-party applications to interface and control the scheduler module to project the one or more desired contents to augment activity experience;
enabling, by the application programming interface, the one or more third-party applications to analyze scores won by the one or more users and compare the scores of the one or more users with other users in the third-party applications and post across one or more social media networks; and
integrating, by the application programming interface, one or more displays connected locally or at remote areas to provide information to the one or more users regarding scores, rewards, and compliments.

18. The method of claim 10, further comprising:
training the one or more users based on the calculated co-ordinates, trajectories and path to perform at least one of (a) effectively interact with the one or more physical activity objects, (b) effectively interact with the one or more virtual objects, (c) perform trick actions and (d perform predefined actions on the one or more activity surfaces; and
monitoring actions of the one or more users based on the training provided and guides the one or more users to perform the one or more predefined actions on the one or more activity surfaces through at least one of audio outputs and video outputs.

19. A non-transitory computer storage medium storing a sequence of instructions, which when executed by a processor, causes interactive reality activity augmentation, by
emanating illumination on one or more activity surfaces and capturing one of (a) a series of real-time images and (b) co-ordinates information of the one or more activity surfaces, the one or more activity surfaces being engaged by one or more users using at least one of (a) one or more physical activity objects and (b) one or more virtual objects;
communicating a signal to one or more digital projectors to project one or more contents comprising the one or more virtual objects over the one or more activity surfaces;
receiving one of (a) the series of captured real-time images of the one or more activity surfaces and (b) the coordinates information of the one or more activity surfaces from a sensing unit via one or more media transceivers or via direct connections;
processing one of (a) the series of received real-time images and (b) the received coordinates information of the one or more activity surfaces to detect presence of the one or more physical activity objects, the one or more virtual objects and the one or more users on the one or more activity surfaces, and track trajectories and calculate individual co-ordinates of the one or more physical activity objects, the one or more virtual objects and the one or more users along the one or more activity surfaces;
analyzing the calculated individual co-ordinates information of the one or more physical activity objects, the one or more virtual objects and the one or more users to detect information of at least one of (a) interaction between the one or more users and the one or more virtual objects and (b) interaction between the one or more physical activity objects and the one or more virtual objects; and
communicating the calculated individual co-ordinates information and the detected interaction information to a scheduler through an application program interface to manipulate the one or more contents running inside the scheduler in real-time in response to the interaction information detected and the individual co-ordinates information.

20. The non-transitory computer storage medium of claim 19, further causes interactive reality activity augmentation by:
receiving the one or more manipulated contents from a server; and
projecting the one or more manipulated contents over the one or more activity surfaces in real-time to provide interactive augmented reality activity experience.

* * * * *